US008538192B2

(12) United States Patent
Habuka et al.

(10) Patent No.: US 8,538,192 B2
(45) Date of Patent: Sep. 17, 2013

(54) IMAGE PROCESSING DEVICE, IMAGE PROCESSING METHOD AND STORAGE MEDIUM

(75) Inventors: Kensuke Habuka, Bunkyo-ku (JP); Toshiki Shino, Bunkyo-ku (JP)

(73) Assignee: Morpho, Inc., Tokyo (JP)

( * ) Notice: Subject to any disclaimer, the term of this patent is extended or adjusted under 35 U.S.C. 154(b) by 0 days.

(21) Appl. No.: 13/260,278

(22) PCT Filed: Oct. 26, 2010

(86) PCT No.: PCT/JP2010/068975
§ 371 (c)(1),
(2), (4) Date: Sep. 24, 2011

(87) PCT Pub. No.: WO2012/056518
PCT Pub. Date: May 3, 2012

(65) Prior Publication Data
US 2012/0177302 A1    Jul. 12, 2012

(51) Int. Cl.
*G06K 9/40* (2006.01)
*G06K 9/36* (2006.01)

(52) U.S. Cl.
USPC .......................................... 382/274; 382/284

(58) Field of Classification Search
USPC ................. 382/274, 282, 284, 294, 190, 195, 382/199, 256, 266
See application file for complete search history.

(56) References Cited

U.S. PATENT DOCUMENTS

| 5,598,215 A * | 1/1997 | Watanabe ................ 348/416.1 |
| 5,982,951 A | 11/1999 | Katayama et al. |
| 6,215,914 B1 | 4/2001 | Nakamura et al. |

(Continued)

FOREIGN PATENT DOCUMENTS

| JP | 9-321972 A | 12/1997 |
| JP | 10-91765 A | 4/1998 |
| JP | 11-102430 A | 4/1999 |
| JP | 11-196319 A | 7/1999 |

(Continued)

OTHER PUBLICATIONS

International Preliminary Report on Patentability in International Application No. PCT/JP2010/068975 dated May 23, 2013.

*Primary Examiner* — Yon Couso
(74) *Attorney, Agent, or Firm* — Sughrue Mion, PLLC

(57) ABSTRACT

An image processing device that sequentially generates a synthetic image by joining a first image, which is a single image or constituted by a plurality of the images joined together, and a second image that is input, every time when the second image is input, includes: an overlapping region obtainment portion 14 that obtains a motion vector on the basis of the second image and an image input immediately before the second image among the images constituting the first image, and obtains an overlapping region where the image input immediately before and the second image overlap each other on the basis of the obtained motion vector; a brightness-value conversion factor calculation portion 16 that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion 12 that generates the synthetic image by converting the first image or the second image using the brightness conversion factor and by joining the first image and the second image.

20 Claims, 15 Drawing Sheets

(56) References Cited

U.S. PATENT DOCUMENTS

| | | | |
|---|---|---|---|
| 6,292,593 B1 * | 9/2001 | Nako et al. | 382/284 |
| 6,720,997 B1 | 4/2004 | Horie et al. | |
| 7,415,167 B2 * | 8/2008 | Komiya et al. | 382/284 |
| 8,164,685 B2 * | 4/2012 | Watanabe | 348/363 |
| 2010/0231731 A1 * | 9/2010 | Motomura et al. | 348/208.4 |

FOREIGN PATENT DOCUMENTS

| | | |
|---|---|---|
| JP | 2002-42109 A | 2/2002 |
| JP | 2006-119730 A | 5/2006 |
| JP | 2006-345400 A | 12/2006 |
| JP | 2009-33224 A | 2/2009 |
| JP | 2009-33392 A | 2/2009 |

* cited by examiner

IMAGE PROCESSING DEVICE, IMAGE PROCESSING METHOD AND STORAGE MEDIUM

CROSS REFERENCE TO RELATED APPLICATIONS

This application is a National Stage of International Application No. PCT/JP2010/068975 filed on Oct. 26, 2010, the contents of all of which are incorporated herein by reference in their entirety.

TECHNICAL FIELD

The present invention relates to an image processing device, an image processing method, and an image processing program.

BACKGROUND ART

Hitherto, a device that creates a panoramic still image, which is a single wide-angle still image by joining picked up images has been known as an image processing device (See Patent Documents 1 and 2, for example). The image processing device described in Patent Documents 1 and 2 are configured such that when a first image and a second image are joined together, a small region is template-matched and positioned in a region where the first image overlaps the second image, a pixel value of at least one image in the region where the two images overlap each other is subjected to gradation conversion and brightness of the region where the two images overlap each other is corrected so that the joint does not become noticeable.

Citation List

Patent Literature

Patent Document 1: Japanese Unexamined Patent Application Publication No. 9-321972

Patent Document 2: Japanese Unexamined Patent Application Publication No. 10-91765

SUMMARY OF INVENTION

Technical Problem

Digital cameras are becoming widespread these days and are also employed in portable equipment such as a mobile phone. In the above equipment for which size reduction is in demand, generation processing of a panoramic image at high speed with a little resource is requested. In the devices described in Patent Documents 1 and 2, there is still a room for improvement in view of speed-up in processing.

Then, the present invention was made in order to solve such technical problems and has an object to provide an image processing device, an image processing method, and an image processing program that can perform processing of making a joint between images less noticeable at low load when images with different exposure conditions are to be joined together.

Solution to Problem

That is, the image processing device according to the present invention is an image processing device that sequentially generates a synthetic image by joining a first image, which is a single image or is constituted by a plurality of the images joined together, and a second image that is input, every time when the second image is input, the device comprising: an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector; a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion that generates the synthetic image by converting the first image or the second image using the brightness conversion factor and by joining the first image and the second image.

In the image processing device according to the present invention, the motion vector is obtained on the basis of the second image and the image input immediately before, which is input immediately before the second image, by the overlapping region obtainment portion, the overlapping region where the image input immediately before and the second image overlap each other is obtained on the basis of the obtained motion vector, the brightness conversion factor for converting a brightness value of the first image or a brightness value of the second image on the basis of the brightness value of the first image and the brightness value of the second image in the overlapping region is calculated by the brightness-value conversion factor calculation portion so that a change in the brightness values between the first image and the second image becomes small, and the first image or the second image is converted on the basis of the brightness conversion factor and the both images are joined by the synthetic image generation portion. As described above, by obtaining the overlapping region of the image input immediately before and the second image according to the motion vector, information of the brightness value of the overlapping region can be obtained with low load and at high speed. Thus, when images with different exposure conditions are to be joined together, processing to make the joint of the images less noticeable can be performed with low load.

Here, it is preferable that the image processing device further comprises: a brightness absolute-value calculation portion that calculates a brightness absolute value of the second image, the brightness absolute value being a ratio of the total sum of the brightness values of a predetermined reference image in the first image to the total sum of the brightness values of the second image on the basis of the total sum of the brightness values of the image input immediately before and the total sum of the brightness values of the second image in the overlapping region, wherein the brightness-value conversion factor calculation portion calculates, on the basis of the brightness absolute value of a target image overlapping the second image among the images constituting the first image and the brightness absolute value of the second image, the brightness value conversion factor of the second image that depends on a distance from a joint between the target image and the second image.

By configuring as above, since the brightness absolute value can be calculated on the basis of the total sum of the brightness values and the brightness conversion factor can be calculated using this brightness absolute value, robust calculation is realized. Also, the brightness absolute value of the second image is calculated on the basis of the brightness absolute value of the image input immediately before without using the total sum of the brightness values of the reference images, each of which is an image constituting the first image, used as the basis when the brightness absolute value is calculated. That is, there is no need to record the total sum of the brightness values of the reference images all the time in order to calculate the brightness absolute value of the second image input sequentially. Thus, a processing load can be reduced.

Also, it is preferable that the brightness-value conversion factor calculation portion calculates the brightness-value conversion factor so that a weight of the second image at a synthetic position (a predetermined position in a synthetic campus) becomes large in proportion to the distance from the joint.

By configuring as above, the brightness value after the conversion of the second image can be corrected so that the farther the second image is away from the joint, the closer the value gets to the original brightness value.

Also, the synthetic image generation portion may determine the brightness-value conversion factor at the synthetic position on the basis of the distance from the joint at the synthetic position, derive a correction function that converts the brightness value of the second image on the basis of the determined brightness-value conversion factor and calculates the brightness value of the second image used at the synthetic position on the basis of the correction function and the brightness value of the second image.

Also, the correction function is preferably a linear function with the brightness-value conversion factor as a proportional constant in a range in which a pixel value before the conversion and the pixel value after the conversion are less than a predetermined threshold value and a linear function continued from the linear function up to the threshold value and passing through the maximum pixel value in a range in which the pixel value before the conversion or the pixel value after the conversion is equal to more than the predetermined threshold value.

As described above, by employing the linear function as the correction function, its calculation cost of the correction function can be kept low. Also, in the range in which the pixel value before the conversion or the pixel value after the conversion is equal to more than the predetermined threshold value, by setting the correction function as the linear function continued from the linear function up to the threshold value and passing through the maximum pixel value, a natural synthetic image can be generated while its calculation cost of the correction function is kept low.

Also, it is preferable that the image processing device further comprises: a center-position obtainment portion that obtains the motion vector on the basis of the image input immediately before the second image among the images constituting the first image and the second image, and obtains position information of a first center point, which is a center point of each of the images constituting the first image, and position information of a second center point, which is a center point of the second image, on the basis of the obtained motion vector, wherein the synthetic image generation portion obtains the first center point of the image overlapping the second image among the images constituting the first image and generates the synthetic image by joining the first image and the second image using a perpendicular bisector between the obtained first center point and the second center point as a joint between the first image and the second image on the basis of the obtained position information of the first center point and the position information of the second center point.

By configuring as above, when the first image and the input second image are to be joined sequentially, since the perpendicular bisector between the first center point and the second center point can be used as the joint between the images, sequential synthesizing processing can be realized at high speed and with low load. Moreover, since a deviation amount between the two images can be reduced by using the perpendicular bisector, a quality of the synthetic image can be improved.

Moreover, it is preferable that the synthetic image generation portion makes a pixel value within a range from the joint between the first image and the second image to a position separated from the joint by a predetermined distance and within a range smaller than the overlapping region, a synthetic value of the pixel value of the first image and the pixel value of the second image.

By configuring as above, since the pixel value to the position separated by the predetermined distance from the joint is made as the synthetic value, the joint can be made less noticeable. Also, since the synthetic value of the pixel value can be calculated using the second image after the brightness value is converted, a large change in the difference in the brightness value can be avoided. Moreover, since the adjustment processing of the brightness value and the synthesizing processing of the pixel value can be performed separately and independently, for example, while a processing load is reduced by narrowing a synthetic region close to the joint, the difference in the brightness values between the first image and the second image which becomes noticeable by narrowing a first region can be corrected on the basis of the brightness values of the first image and the second image in a region wider than the region where the pixels are synthesized.

Also, an image processing method according to the present invention is an image processing method that sequentially generates a synthetic image by joining a first image, which is a single image or is constituted by a plurality of the images joined together, and a second image that is input, every time when the second image is input, the method comprising the steps of obtaining a motion vector on the basis of the second image and an image input immediately before the second image among the images constituting the first image, and obtaining an overlapping region where the image input immediately before and the second image overlap each other on the basis of the obtained motion vector; calculating, on the basis of a brightness value of the first image and a brightness value of the second image, a brightness value conversion factor for converting the brightness value of the first image or the brightness value of the second image on the basis of the brightness value of the first image and the brightness value of the second image in the overlapping region so that a change in the brightness values between the first image and the second image becomes small; and generating the synthetic image by converting the first image or the second image using the brightness conversion factor and by joining the first image and the second image.

According to the image processing method of the present invention, the same advantages as those of the above-described image processing device of the present invention can be exerted.

Also, an image processing program according to the present invention is an image processing program that causes a computer to function so as to sequentially generate a synthetic image by joining a first image, which is a single image or is constituted by a plurality of the images joined together, and a second image that is input, every time when the second image is input, the program causing a computer to function as: an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector; a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion that generates the synthetic image by converting the first image or the second image using the brightness conversion factor and by joining the first image and the second image.

According to the image processing program of the present invention, the same advantages as those of the above-described image processing device can be exerted.

Advantageous Effects of Invention

According to the present invention, when images with different exposure conditions are to be joined together, processing to make the joint of the images less noticeable can be performed with low load.

DESCRIPTION OF EMBODIMENTS

Figure 1:
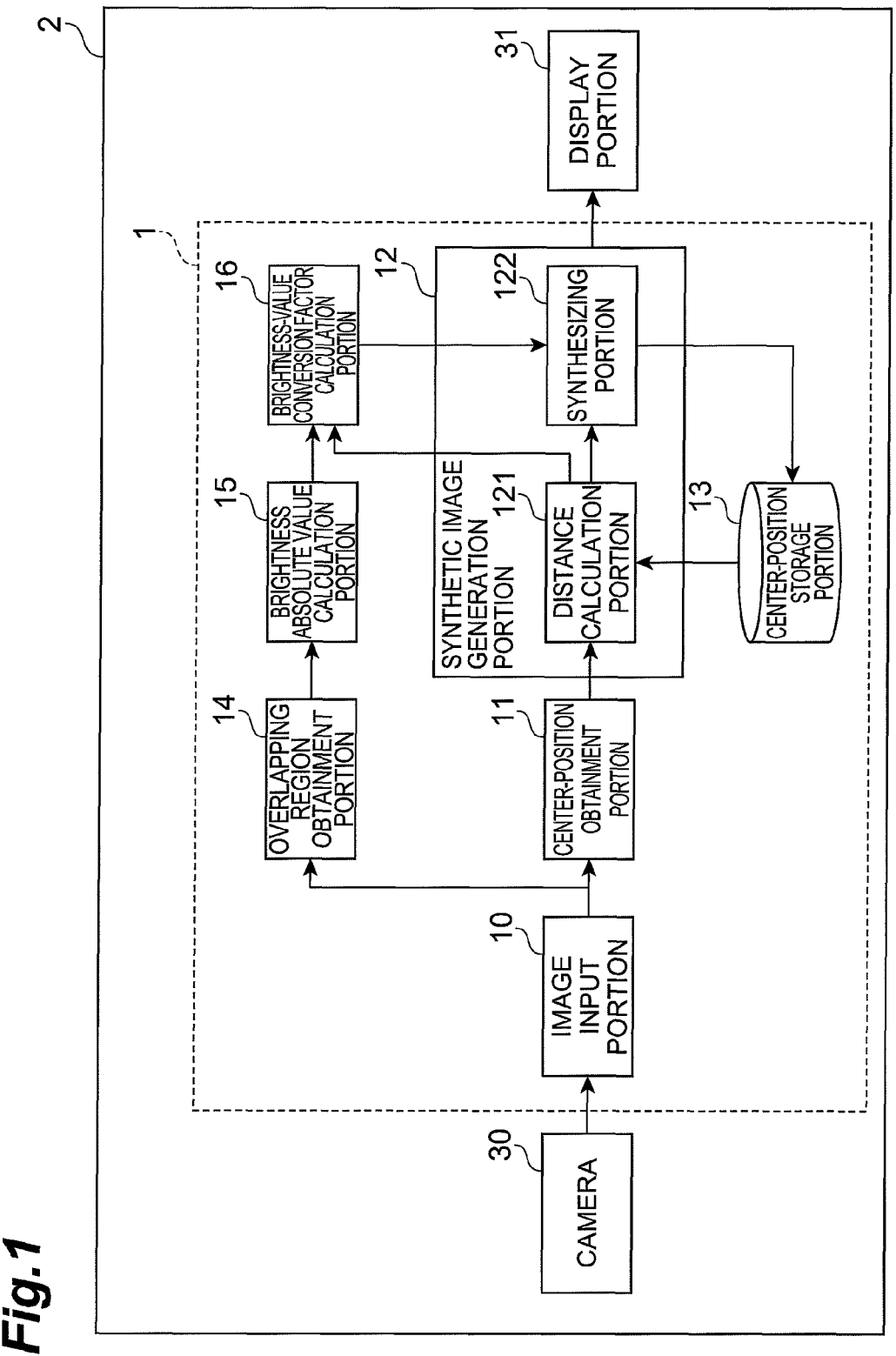
FIG. 1 is a functional block diagram of a mobile terminal on which an image processing device according to the embodiment is mounted.

An embodiment of the present invention will be described below by referring to the attached drawings. In each figure, the same reference numerals are given to the same or corresponding components and duplicated explanation will be omitted.

An image processing device according to this embodiment is a device that sequentially generates a single image by joining input images at each input and is favorably employed, for example, if a plurality of continuously picked up images is joined on a real time basis so as to generate a panoramic image having a wider angle than the single picked up image. The image processing device according to this embodiment is favorably mounted on a mobile terminal with limited resource such as a mobile phone, a digital camera, a PDA (Personal Digital Assistant) and the like, but it is not limited to such devices and the image processing device may be mounted on a usual computer system, for example. In the following, for facilitation of understanding, an image processing device to be mounted on a mobile terminal provided with a camera function will be described as an example of the image processing device according to the present invention.

Figure 2:
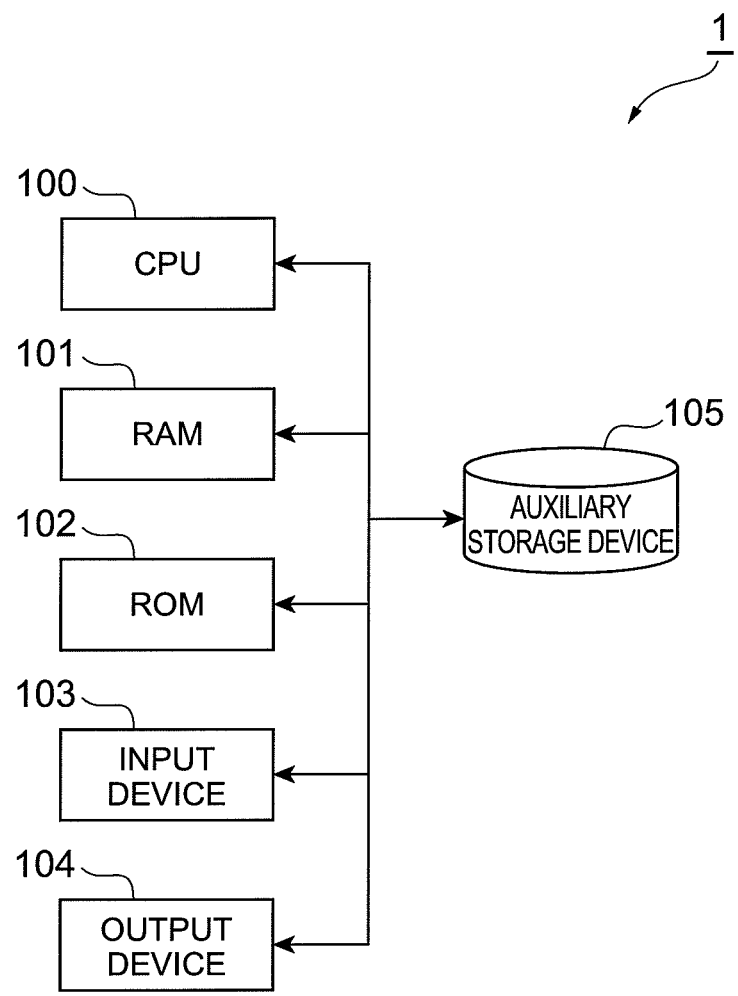
FIG. 2 is a hardware configuration diagram of the mobile terminal on which an image processing device according to the embodiment is mounted.

FIG. 1 is a functional block diagram of a mobile terminal 2 provided with an image processing device 1 according to this embodiment. The mobile terminal 2 shown in FIG. 1 is a portable terminal carried by a user, for example, and has a hardware configuration shown in FIG. 2. FIG. 2 is a hardware configuration diagram of the mobile terminal 2. As shown in FIG. 2, the mobile terminal 2 is physically constituted as a usual computer system including a CPU (Central Processing Unit) 100, main storage devices such as a ROM (Read Only Memory) 101, a RAM (Random Access Memory) 102 and the like, an input device 103 such as a camera, a keyboard and the like, an output device 104 such as a display, an auxiliary storage device 105 such as a hard disk and the like. Each function of the mobile terminal 2 and the image processing device 1, which will be described later, is realized by having a predetermined computer software read in a hardware such as the CPU 100, the ROM 101, the RAM 102 and the like so as to operate the input device 103 and the output device 104 under control of the CPU 100 and data reading and writing in the main storage device and the auxiliary storage device 105. The above explanation is made as a hardware configuration of the mobile terminal 2, but the image processing device 1 may be constituted as a usual computer system including the main storage device such as the CPU 100, the ROM 101, the RAM 102 and the like, the input device 103, the output device 104, the auxiliary storage device 105 and the like. Also, the mobile terminal 2 may be provided with a communication module and the like.

As shown in FIG. 1, the mobile terminal 2 is provided with a camera 30, the image processing device 1 and a display portion 31. The camera 30 has a function of picking up an image. As the camera 30, an image pickup element or the like is used. The camera 30 has a continuous image pickup function of repeatedly picking up images with a predetermined interval from timing specified by a user operation and the like, for example. The user can take continuous images overlapping at least vertically and horizontally by sliding the camera 30, for example. And the camera 30 has a function of outputting the picked up image to the image processing device 1 at each pickup, for example.

The image processing device 1 is provided with an image input portion 10, a center-position obtainment portion 11, a synthetic image generation portion 12, a center-position storage portion 13, an overlapping region obtainment portion 14, a brightness absolute-value calculation portion 15, and a brightness-value conversion factor calculation portion 16.

The image input portion 10 has a function of inputting an image picked up by the camera 30. The image input portion 10 has a function of inputting an image picked up by the camera 30 at each pickup, for example. Also, the image input portion 10 has a function of storing the first input image in a first temporary storage region provided in the mobile terminal 2. Also, the image input portion 10 has a function of storing images input continuously at the upcoming and thereafter time in a second temporary storage region provided in the mobile terminal. As will be described later, the second temporary storage region is updated at each input of a new image and the first temporary storage region overwrites and stores the image sequentially synthesized at each image input (intermediate synthetic image). The image stored in the first temporary storage region is referred to as a first image and the image stored in the second temporary storage region as a second image in the following description.

Figure 3:
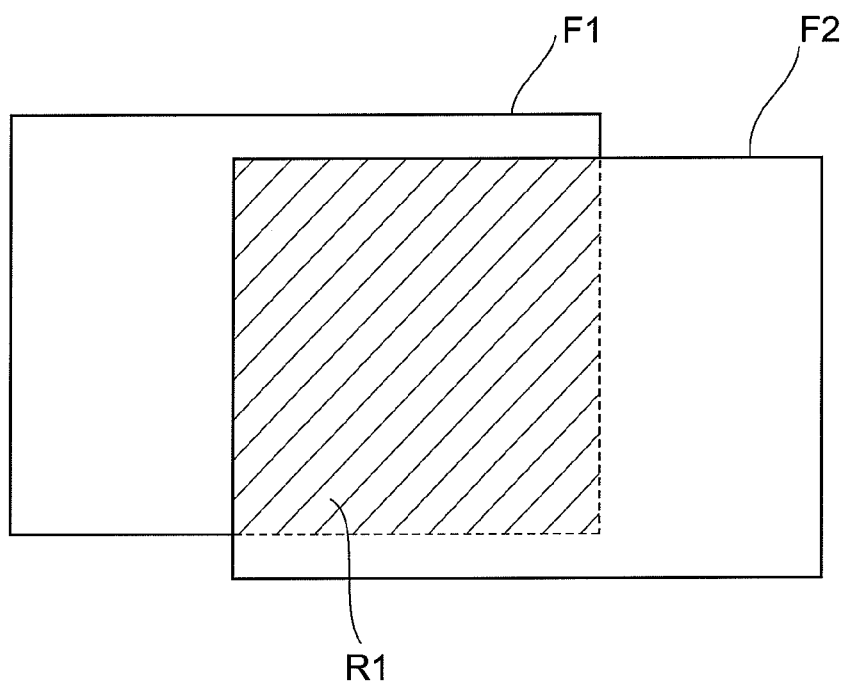
FIG. 3 is an outline diagram for explaining an overlapping region between an image already input and an image input thereafter.
Figure 4:
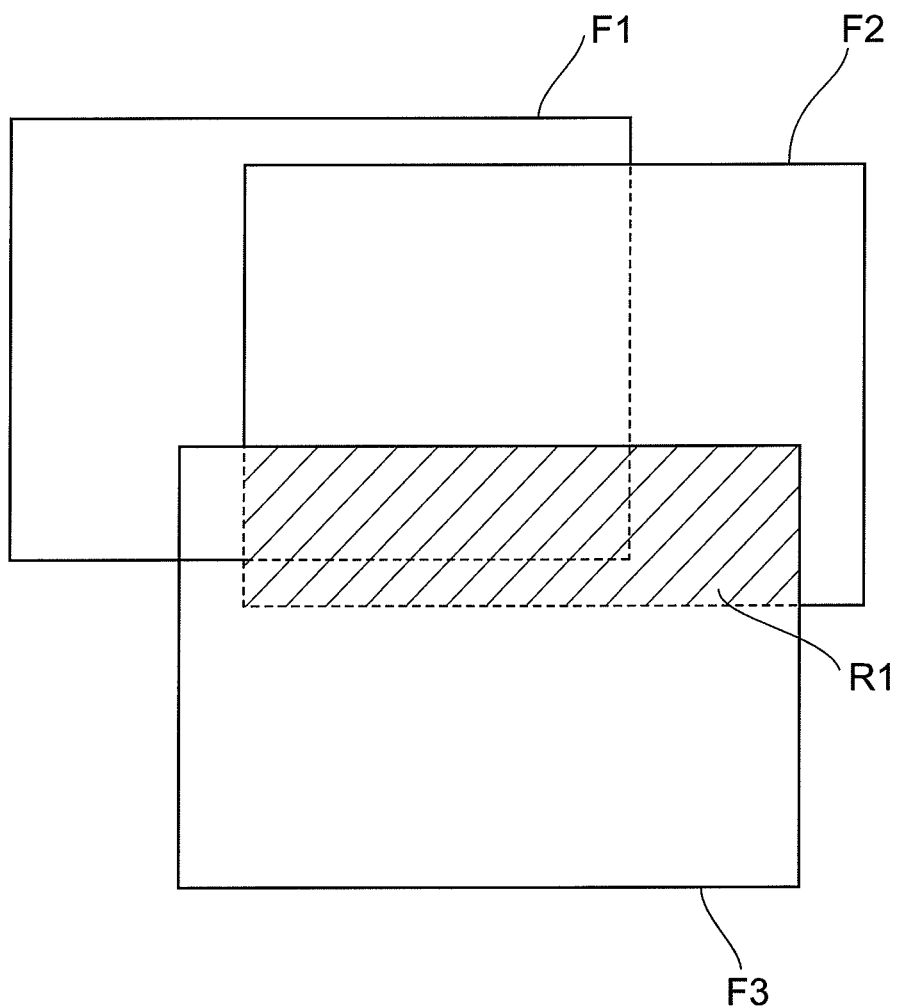
FIG. 4 is an outline diagram for explaining the overlapping region between a synthetic image and an image input thereafter.

The overlapping region obtainment portion 14 has a function of detecting a motion of the camera (motion vector) on the basis of the input image and the image input immediately before the last input (image input immediately before). Also, the overlapping region obtainment portion 14 has a function of obtaining an overlapping region of the input image and the image input immediately before on the basis of the obtained motion vector. FIGS. 3 and 4 are outlined diagrams for explaining the overlapping region. As shown in FIG. 3, an overlapping region R1 of a first image F1 and a second image F2 can be calculated on the basis of the motion of the camera. Also, as shown in FIG. 4, if the first image is constituted by a plurality of images F1 and F2, an overlapping region R2 of a second image F3 and the image F2 input immediately before the second image F3 can be calculated on the basis of the motion of the camera. The overlapping regions R1 and R2 are rectangular regions and are extremely easy to specify. Moreover, the overlapping region obtainment portion 14 has a function of outputting information of the overlapping region to the brightness absolute-value calculation portion 15.

The brightness absolute-value calculation portion 15 has a function of calculating a brightness absolute value of the input image. The brightness absolute value is a brightness value calculated based on the brightness value of a given image. The image to be the reference is not particularly limited but here, the first image, which is input first and stored in the first temporary storage region, will be described as the reference. Also, the brightness absolute value is calculated on the basis of the total sum of the brightness values in the overlapping region specified by the overlapping region obtainment portion 14. That is, the brightness absolute-value calculation portion 15 calculates the total sum of the brightness values of the second image included in the overlapping region and the brightness values of the images input immediately before included in the overlapping region and calculates the brightness absolute value of the second image on the basis of the ratio of the total sums of the brightness values of the both and the brightness absolute value of the image input immediately before. Assuming that the total sum of the brightness values of the second image included in the overlapping region is $S_2$, the total sum of the brightness values of the image input immediately before included in the overlapping region is $S_1$, and the brightness absolute value of the image input immediately before is $H_1$, the brightness absolute value $H_2$ of the second image is calculated by using the following formula 1:

[Formula 1]

$$H_2 = H_1 \cdot \frac{S_2}{S_1} \qquad (1)$$

As the brightness absolute value of the first image, which is input first and stored in the first temporary storage region, for example, a predetermined value or 1 is used. Also, the brightness absolute-value calculation portion 15 has a function of outputting the calculated brightness absolute value to the brightness-value conversion factor calculation portion 16.

The center-position obtainment portion 11 has a function of obtaining position information of a center point of an image (initial first image or the second image) input by the image input portion 10. The center point is a point determined unambiguously from the outer edge of the image. The position information may be position information associated with an actual space or relative position information associated among images continuously input. The center-position obtainment portion 11 has a function of detecting a motion of a camera (motion vector) on the basis of an input image and an image input immediately before in order to obtain the position information. Also, the center-position obtainment portion 11 has a function of calculating the position information of the center point of the input image on the basis of the obtained motion vector and the position information of the center point of the image input immediately before. The center-position obtainment portion 11 obtains the position information of the center point only with the image for the image input first (initial first image) and obtains the position information of the center point on the basis of the motion vector obtained by using the input image and the image input immediately before for the image that is input thereafter (second image). For the second image input at the n-th time (n>1), for example, the motion vector is obtained by using the second image and the second image input at the (n−1)-th time, and the position information of the center point of the second image input at the n-th time is obtained on the basis of the obtained motion vector. Here, the center-position obtainment portion 11 may calculate the motion vector by reducing the image input immediately before and by using the image further made to be formed only by a brightness element instead of the image input immediately before. By working on the image input immediately before so as to obtain the motion vector, processing time or processing cost can be reduced. In the following description, the center point of each of the image constituting the first image will be referred to as a first center point and the center point of the second image as a second center point. Moreover, the center-position obtainment portion 11 has a function of outputting the position information of the obtained center point to the synthetic image generation portion 12.

The synthetic image generation portion 12 has a function of generating a synthetic image in which the input image (second image) and the already input image (first image) are joined, and comprises a distance calculation portion 121 and a synthesizing portion 122.

The distance calculation portion 121 has a function of specifying an image overlapping the second image among the images constituting the first image on the basis of the motion vector obtained by the center-position obtainment portion 11, for example. The distance calculation portion 121 has a function of specifying the first center point being closest to a predetermined position of the image overlapping the second image and of calculating a distance between the specified first center point and the second center point of the second image. Here, in order to speed up the above calculation processing, the predetermined position may be a position indicated by one of grid-arrayed points. For example, the grid points are arrayed in a synthetic image (first image, here) and used as the above-mentioned predetermined position. The distance calculation portion 121 has a function of specifying the first center point being closest to the grid point for each grid point before the calculation of the distance between the first center point and the second center point and of storing it in the center-position storage portion 13 in advance. That is, the center-position storage portion 13 stores the grid point included in the first image and the first center point being closest to the grid point in association with each other. In this case, the distance calculation portion 121 specifies the image overlapping the input second image among the images constituting the first image and obtains the first center point being closest to the specified grid point by referring to the center-position storage portion 13. If there is a plurality of images overlapping the second image among the images constituting the first image, the closest first center point might be different depending on the grid point. In this case, the distance calculation portion 121 calculates the distance between the first center point different among the grid points and the second center point. The distance calculation portion 121 has a function of outputting the calculated distance to the synthesizing portion 122. Also, the distance calculation portion 121 has a function of outputting to the brightness-value conversion factor calculation portion 16, coordinate information of the first center point and the second center point used in calculation of the distance and the like.

The brightness-value conversion factor calculation portion 16 has a function of calculating a brightness-value conversion factor, which is a factor of a correction function for converting a brightness value. The brightness-value conversion factor calculation portion 16 has a function of calculating a brightness-value conversion factor of the second image depending on the distance from a joint between a target image and the second image on the basis of a brightness absolute value of the target image overlapping the second image among the images constituting the first image and the brightness absolute value of the second image. For example, the brightness-value conversion factor calculation portion 16 specifies a perpendicular bisector, which is a joint between the first image and the second image on the basis of the position information of the first center point and the second center point. Then, the brightness-value conversion factor calculation portion 16 calculates a brightness-value conversion factor J using the following formula 2:

[Formula 2]

$$J = \frac{H_{ex}}{H_2} = \left(H_f \cdot \left(1 - \frac{D}{D_0}\right) + H_2 \cdot \frac{D}{D_0}\right) \cdot \frac{1}{H_2} \quad (2)$$

where $H_{ex}$ is a brightness absolute value at a synthetic position (a predetermined position in the synthetic campus), $H_2$ is a brightness absolute value of the second image, $H_f$ is a brightness absolute value of a target image, $D_0$ is a maximum distance from the perpendicular bisector to the synthetic position (threshold value that determines a brightness conversion region), and D is a distance from the perpendicular bisector to the synthetic position. In the case of the distance $D > D_0$, since the synthetic position is located outside the region where the brightness value is converted, it is only necessary that processing is performed with $D = D_0$. As described above, the brightness-value conversion factor calculation portion 16 has a function of calculating the brightness-value conversion factor so that a weight of the second image at the synthetic position becomes larger in proportion to the distance of the synthetic position from the joint. Also, the brightness-value conversion factor calculation portion 16 has a function of calculating the brightness-value conversion factor so that the brightness value in a pixel range from the perpendicular bisector to the maximum synthetic position $D_0$ is converted. The brightness-value conversion factor calculation portion 16 has a function of outputting the generated brightness-value conversion factor to the synthesizing portion 122.

Figure 5:
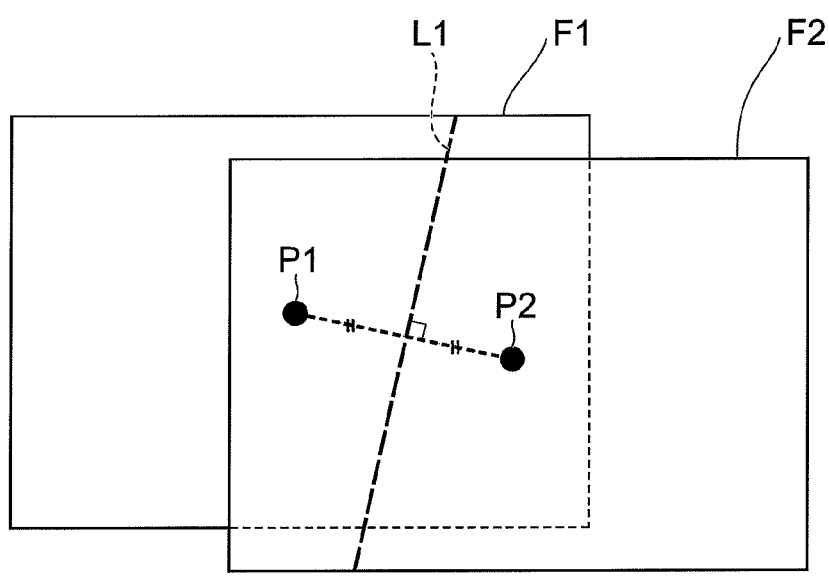
FIG. 5 is an outline diagram for explaining a distance between center points of the already input image and an image input thereafter.
Figure 6:
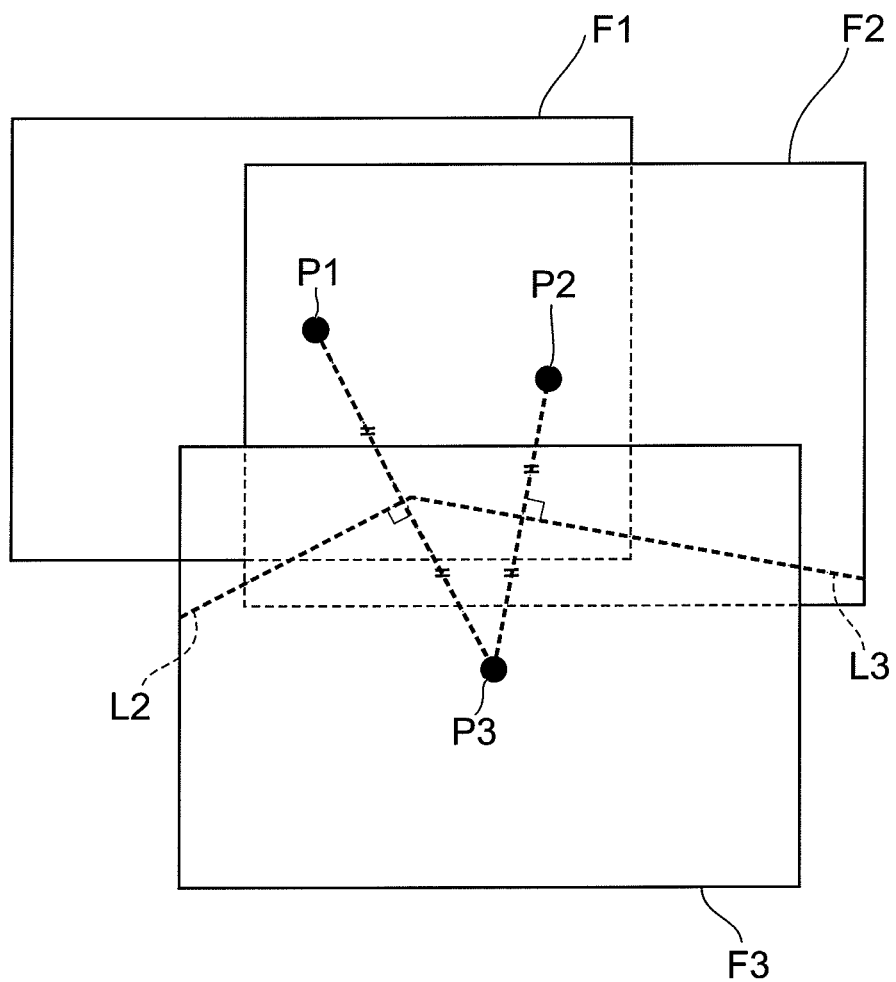
FIG. 6 is an outline diagram for explaining a distance between the center points of the synthetic image and the image input thereafter.

The synthesizing portion 122 has a function of joining the first image and the second image on the basis of the distance between the first center point and the second center point calculated by the distance calculation portion 121. For example, the synthesizing portion 122 has a function of determining a pixel value at the predetermined position on the basis of the distance to the perpendicular bisector between the first center point being closest to the predetermined position and the second center point at the predetermined position in the synthetic image. FIGS. 5 and 6 are outline diagrams for explaining the perpendicular bisector between the first center point and the second center point. As shown in FIG. 5, a perpendicular bisector L1 can be drawn between a first center point P1 of the first image F1 and a second center point P2 of the second image F2. Then, by calculating the distance to the perpendicular bisector L1 at the predetermined position in the synthetic image, the pixel value at the predetermined position is determined. Also, as shown in FIG. 6, if the first image is constituted by a plurality of images F1 and F2, perpendicular bisectors L2 and L3 with the second center point P3 can be drawn for each of the first center points P1 and P2. As described above, if there is a plurality of first center points, a plurality of perpendicular bisectors can be drawn. And by calculating the distance to the perpendicular bisector at the predetermined position in the synthetic image, the pixel value at the predetermined position is determined.

Also, the synthesizing portion 122 has a function of converting the pixel value of the second image before the second image is joined to the first image. For example, the synthesizing portion 122 determines the brightness-value conversion factor J at the synthetic position on the basis of the brightness-value conversion factor J calculated by the brightness-value conversion factor calculation portion 16 and the distance D from the joint to the synthetic position. And the synthesizing portion 122 derives a correction function Y that converts the brightness value of the second image on the basis of the determined brightness-value conversion factor J. The correction function Y is not particularly limited. As the correction function Y, a linear function, for example, is used. Then, the synthesizing portion 122 calculates the brightness value of the second image used at the synthetic position on the basis of a correction function Y and the brightness value of the second image. The synthesizing portion 122 executes changing processing of the brightness value of the second image before image synthesizing processing, which will be described later.

Also, the synthesizing portion 122 uses the distance to the perpendicular bisector in order to employ the pixel value of the image closest to the synthetic position in the first image and the second image as the pixel value of the synthetic position. In other words, the synthesizing portion 122 uses the distance from the predetermined position in the synthetic image to the perpendicular bisector as an evaluation value for evaluating closeness of the input image. For example, the synthesizing portion 122 evaluates closeness T of the input image by the following formula 3:

[Formula 3]

$$T = \frac{A^2 - B^2}{C} \quad (3)$$

where A is a distance from the predetermined position to be synthesized to the second center point, B is a distance from the predetermined position to be synthesized to the closest first center point, and C is a distance from the first center point to the second center point.

The synthesizing portion 122 determines the pixel value at the synthetic position (predetermined position) using the closeness T obtained by the formula 1 as an evaluation value. For example, the synthesizing portion 122 sets the pixel value of the first image as the pixel value of the predetermined position if the distance from the predetermined position to the perpendicular bisector is larger than a predetermined value and the predetermined position is closer to the first center point than the second center point. On the other hand, the synthesizing portion 122 sets the pixel value of the second image as the pixel value of the predetermined position if the distance from the predetermined position to the perpendicular bisector is larger than the predetermined value and the predetermined position is closer to the second center point than the first center point. If the distance from the predetermined position to the perpendicular bisector is not more than the predetermined value, the synthesizing portion 122 synthesizes the pixel value of the first image and the pixel value of the second image and sets the resulting value as the pixel value of the predetermined position. As a method of synthesizing, a conventional method can be employed, and a method in which an average value of the pixel value of the first image and the pixel value of the second pixel or a weighted average value thereof is set as the pixel value of the predetermined position is used. As described above, the synthesizing portion 122 has a function of determining which of the first center point or the second center point is closer to the predetermined position of the synthetic image with respect to the perpendicular bisector as the border and of determining which of the pixel values of the first image or the second image is to be employed. If the predetermined position is adjacent to the perpendicular bisector, that is, if the predetermined position is located within the distance from the perpendicular bisector not more than the predetermined value in the synthetic images, the synthesizing portion 122 has a function of synthesizing the pixel value of the first image and the pixel value of the second image so as to reduce a brightness difference of the joint and of generating a synthetic image with a smaller sense of discomfort. That is, the pixel value at the predetermined position is determined using the closeness T as the evaluation value as shown below:

$T > W$ Region copy is not executed $-W \leq T \leq W$ Synthesizing processing $T \leq -W$ Region copy is executed [Formula 4]

As the predetermined value W used in determination on whether or not the pixel values are to be synthesized, for example, 16 (pixels) is used. In this case, at the image position within 8 pixels with respect to the perpendicular bisector, the pixel value of the first image and the pixel value of the second image are synthesized. Also, by setting the predetermined value W approximately at several pixels to several tens of pixels, it can be set as a region smaller than the overlapping region.

The grid points in the synthetic image are grid-arrayed so as to include the entire first image before the input of the second image. On the other hand, after the input of the second image, the grid points are newly added so as to include not only the first image but also the second image. By employing the grid points as the predetermined position, it is no longer necessary to calculate the distance to the perpendicular bisector for all the positions (pixel positions) included in the synthetic image, and therefore the processing load can be reduced. Moreover, the synthesizing portion 122 can read the first center point being closest to the grid point at high speed by referring to the center-position storage portion 13. As a result, it is no longer necessary to compare the position of the first center points of all the images synthesized in the past with the position of the grid point, and therefore used memory amount can be reduced. For more speed-up, the synthesizing portion 122 has a function of determining the pixel value in the block surrounded by the grid points on the basis of the determination result at the grid point. For example, the synthesizing portion 122 has a function of determining the pixel value at the grid point on the basis of the distance to the perpendicular bisector between the first center point being closest to the grid point and the second center point in the grid-arrayed points in the synthetic image. The synthesizing portion 122 employs the pixel value of the first image for the block (region) surrounded by the grid points having pixel values determined as the first image. That is, the synthesizing portion 122 proceeds to process the subsequent block without executing any processing for this block. On the other hand, the synthesizing portion 122 employs the pixel value of the second image for the block surrounded by the grid points having pixel values determined as the second image. That is, the synthesizing portion 122 copies that of the second image as it is for this block. Then, if all the pixel values at the grid points surrounding the block are not the first image or the second image, that is, if the block crosses the perpendicular bisector, the synthesizing portion 122 has a function of setting the pixel value in the block as the synthetic value of the pixel values of the first image and the second image. In this case, by acquiring the closeness T at the pixel position in the block from the closeness T at the grid point through linear interpolation and by evaluating the result by the above-mentioned evaluating method, the pixel position to be synthesized can be specified appropriately.

In the above, for facilitation of understanding, the pixel value determination function of the synthesizing portion 122 (function of determining which pixel value of the first image or the second image is to be used, or an average value or the like of both the images is to be used at a certain synthetic position) and the brightness-value conversion function have been described separately, and the case that the pixel value is determined after the brightness value is converted has been described, but the brightness value may be converted after the pixel value is determined. Moreover, it may be so configured that, by unifying the determination formulas for exerting the both functions into one, the conversion of the brightness value and the determination of the pixel value are performed at the same time.

The case that the conversion of the brightness value and the determination of the pixel value are performed at the same time will be described below. The distance D used in the formula 2 is ½ of the closeness T used in the formula 3. The distance D takes a positive value if the synthetic position is on the first image side, seen from the perpendicular bisector based on the perpendicular bisector as the origin. The distance D takes a negative value if the synthetic position is on the second image side, seen from the perpendicular bisector. Thus, as shown below, the determination of the pixel value and the necessity of the brightness conversion at the predetermined position can be determined at the same time by using the distance D as the evaluation value:

[Formula 5]

$\frac{W}{2} < D$   The pixel of the first image (skipping)

$-\frac{W}{2} \leq D \leq \frac{W}{2}$   The pixel synthesizing the second image subjected to the brightness conversion and the first image $-D_0 \leq D < -\frac{W}{2}$   The pixel of the second image subjected to the brightness conversion $D < -D_0$   The pixel of the second image (copying)

The predetermined value W is identical to the predetermined value W used in the above determination formula using the closeness T as the evaluation value, and the predetermined value W and the maximum distance $D_0$ are set in advance so that the W/2 becomes smaller than the maximum distance $D_0$ from the perpendicular bisector to the synthetic position. For example, as the predetermined value W (first threshold value) used for determination on whether or not to perform the synthesizing, 16 pixels are used, and as the maximum distance $D_0$ (second threshold value) used for determination on whether or not to perform the brightness conversion, ⅜ of the width of the input image is used. The synthesizing portion 122 can achieve speed-up by executing the above-mentioned determination formula first at each unit of block. Since the synthesizing portion 122 calculates a synthesizing rate (blending rate) and the brightness conversion value for each pixel position, ways of changing the pixel value and the brightness value are independent from each other. However, since the calculation of the distance and the pixel value determination processing can be performed at the same time, speed-up can be realized by using the above determination formula.

Also, the synthesizing portion 122 comprises a function of updating the closest first center point recorded for each grid point after the synthetic image is generated by the above processing. For example, if the synthetic image is generated by joining the first image and the second image, the closest first center point might be changed depending on the grid point included in this synthetic image. Thus, after the joining processing is performed, by executing the processing of updating the closest first center point, accurate information of the closest first center point can be maintained.

Moreover, the synthesizing portion 122 overwrites and stores the synthetic image created by joining the first image and the second image in the first temporary storage region. As described above, the synthesizing portion 122 stores the latest synthetic image in the first temporary storage region. That is, if there is the second image to be input next, the processing of joining the second image to the latest synthetic image (intermediate synthetic image) is performed. As described above, the synthesizing portion 122 does not record and maintain all the images to be synthesized for the reference, but makes the synthesizing of the images possible with small memory amount by sequentially synthesizing the input images. Also, the synthesizing portion 122 has a function of outputting the synthetic image stored in the first temporary storage region to the display portion 31. The display portion 31 is connected to the synthetic image generation portion 12 and has a function of notifying a user of the output of the synthetic image. As the display portion 31, a liquid crystal display or the like is used, for example.

Figure 7:
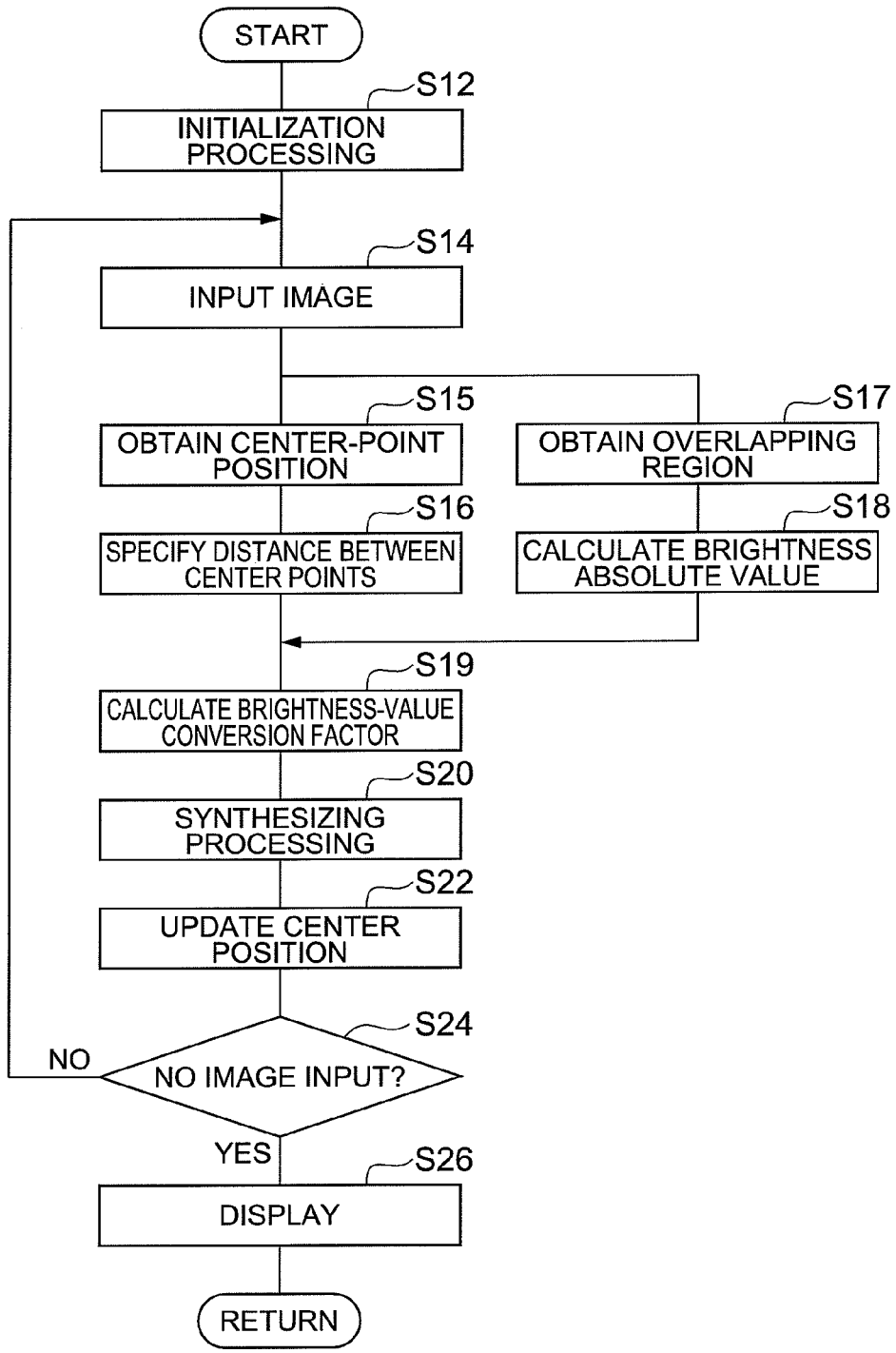
FIG. 7 is a flowchart illustrating an operation of the image processing device according to the embodiment.
Figure 8:
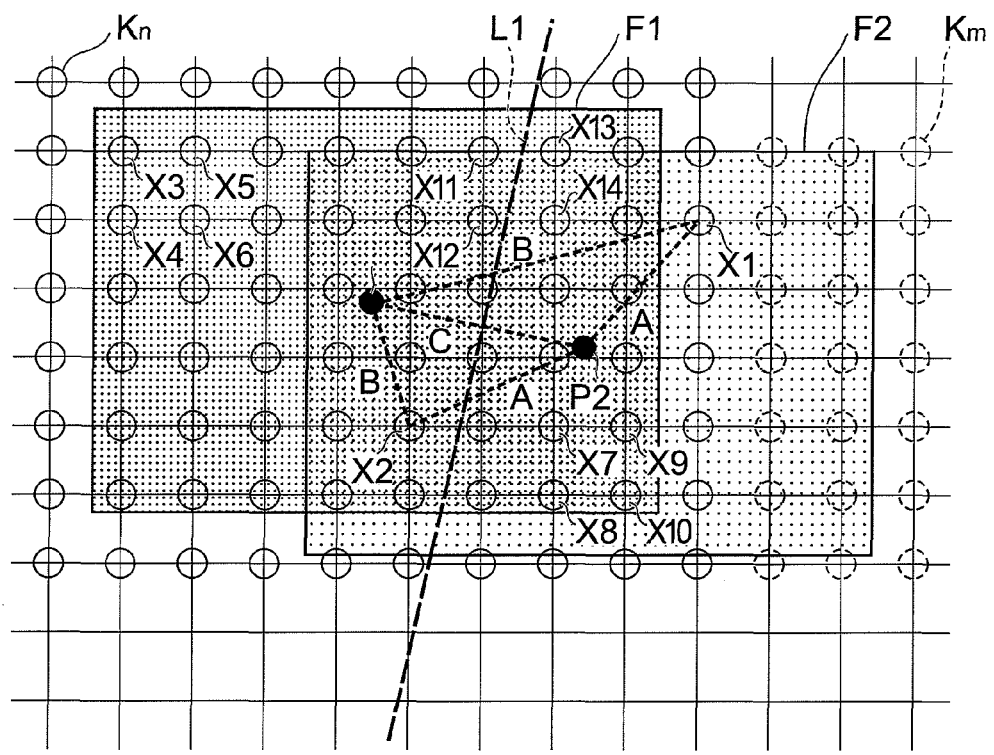
FIG. 8 is an outline diagram for explaining synthesis between the already input image and the image input thereafter.
Figure 9:
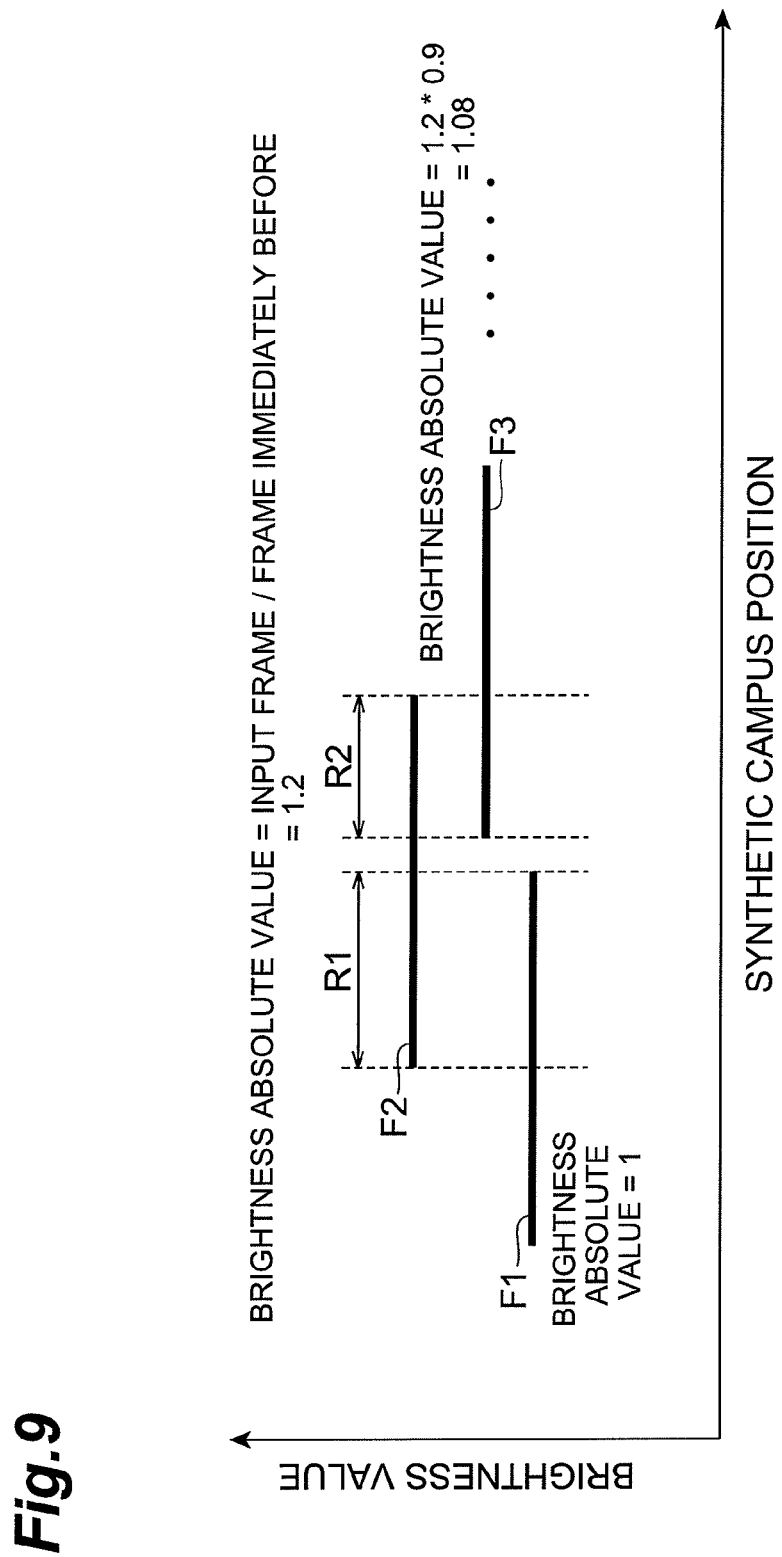
FIG. 9 is an outline diagram for explaining a brightness absolute value.
Figure 10:
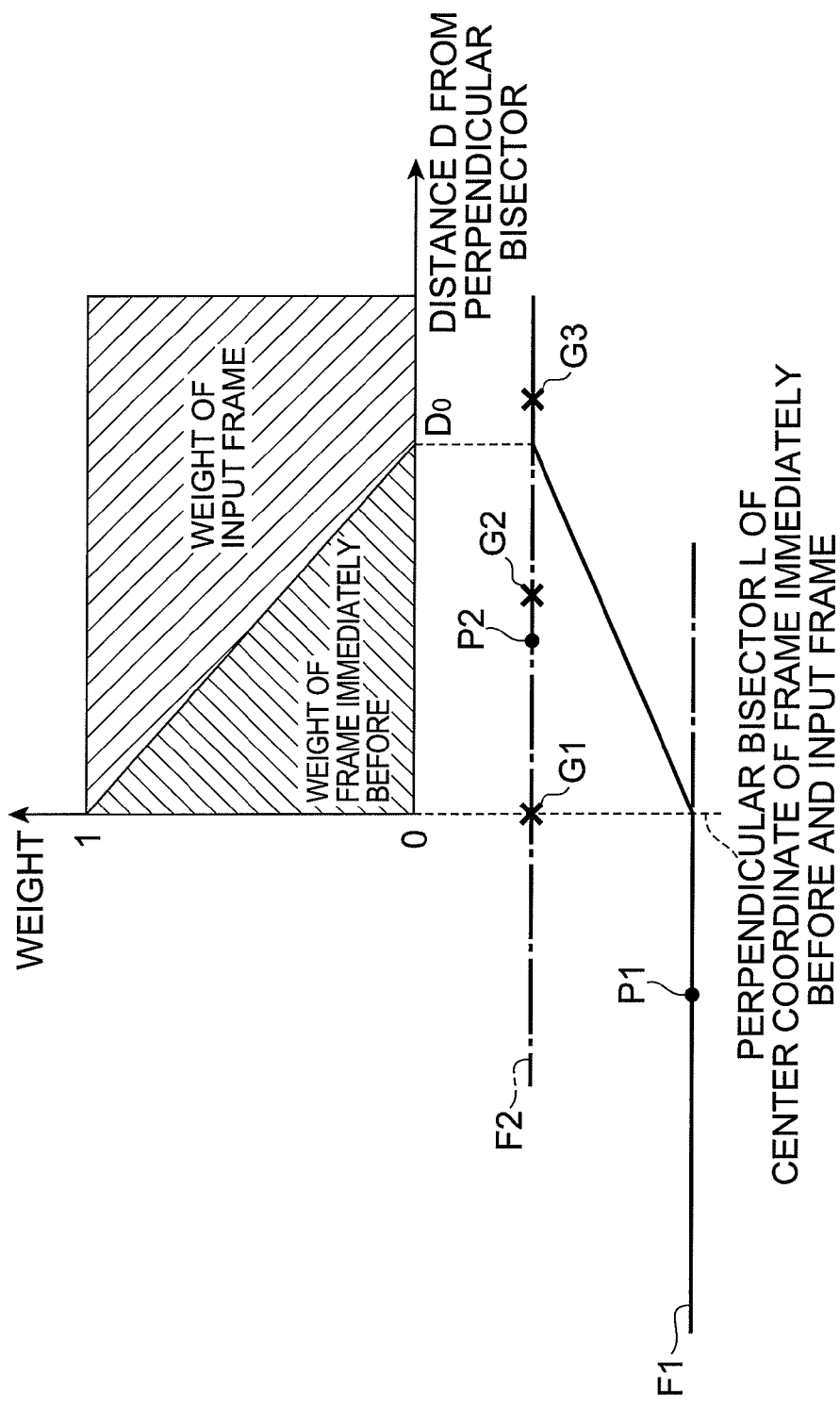
FIG. 10 is an outline diagram for explaining a brightness conversion factor.
Figure 11:
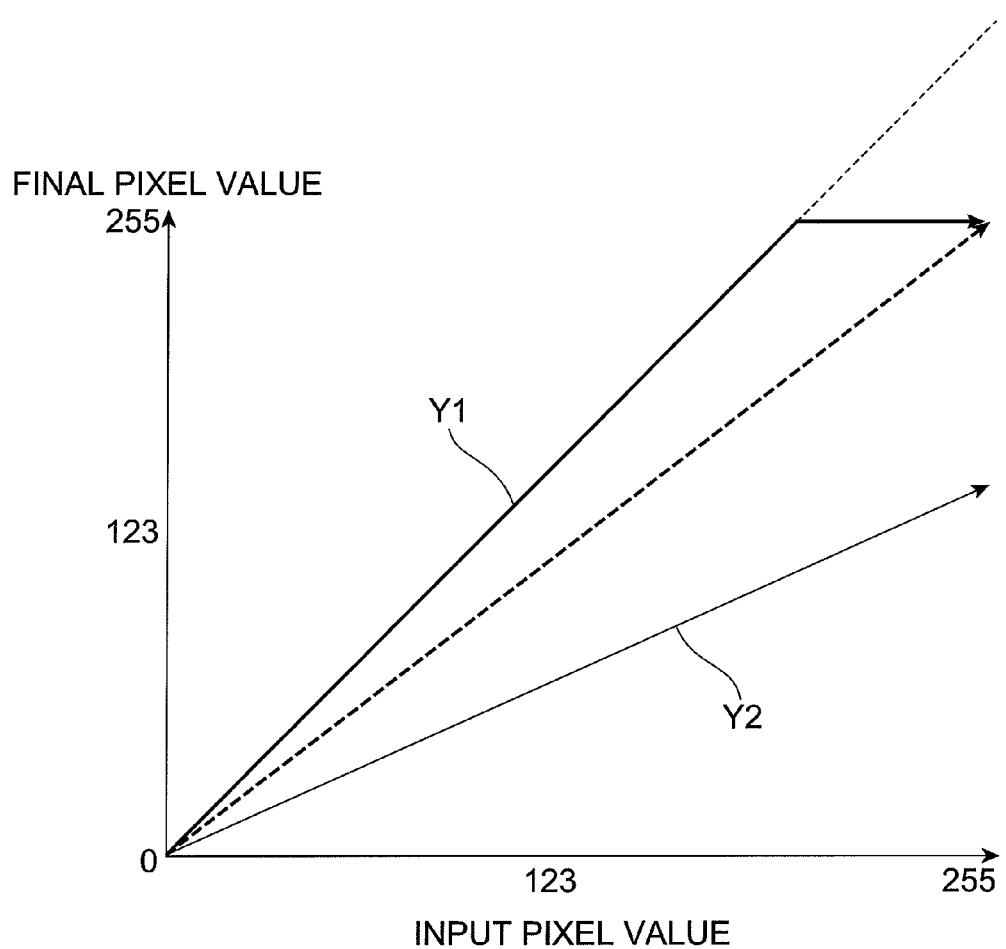
FIG. 11 is an outline diagram for explaining a correction function.
Figure 12:
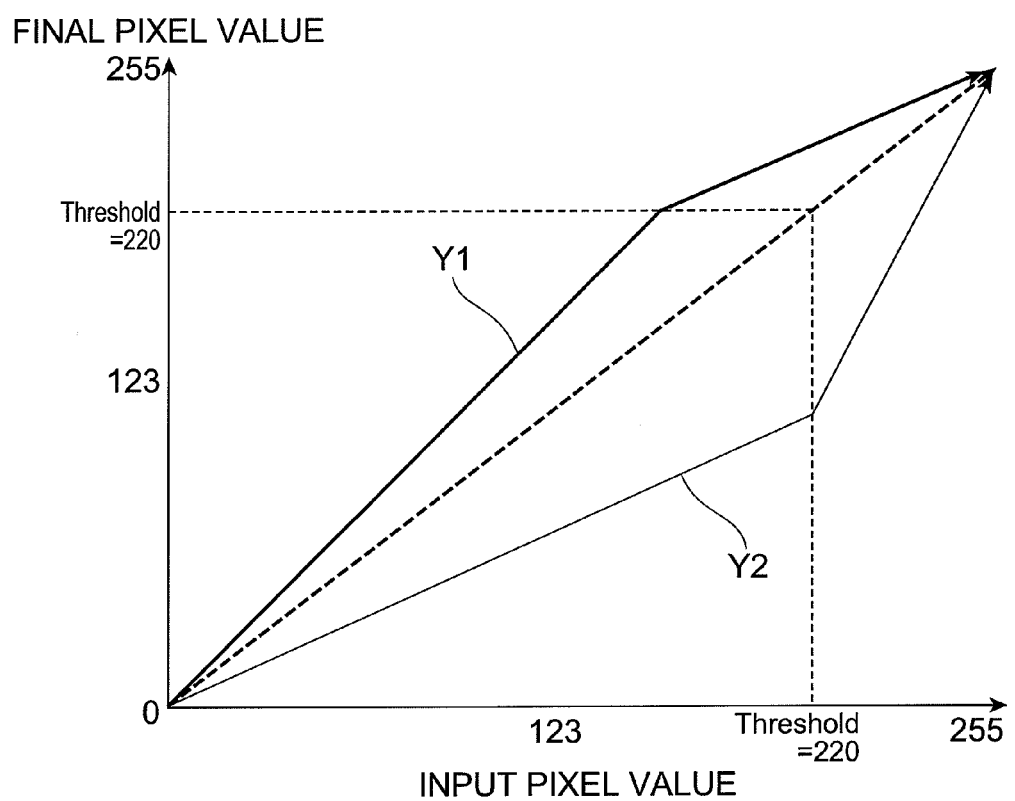
FIG. 12 is an outline diagram for explaining another example of the correction function.
Figure 13:
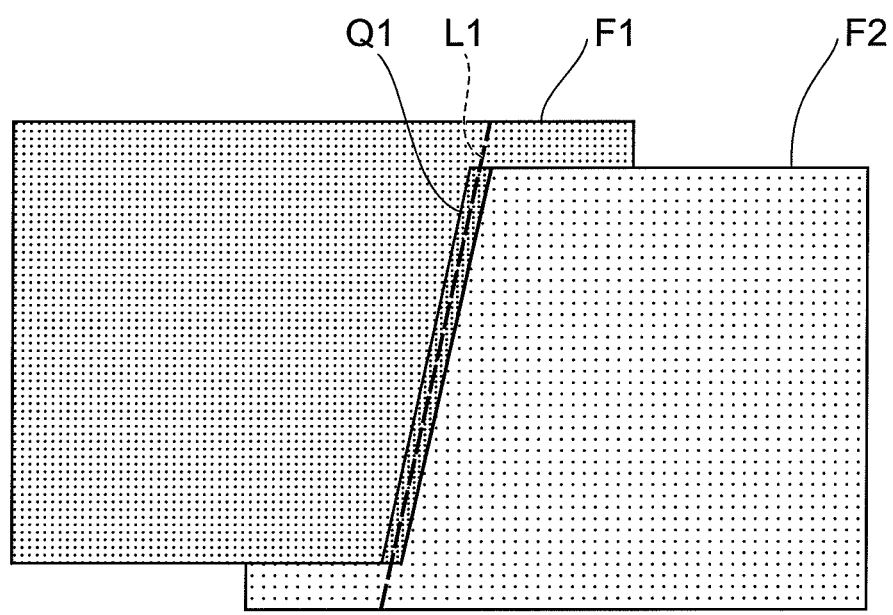
FIG. 13 is an outline diagram for explaining the synthetic image.
Figure 14:
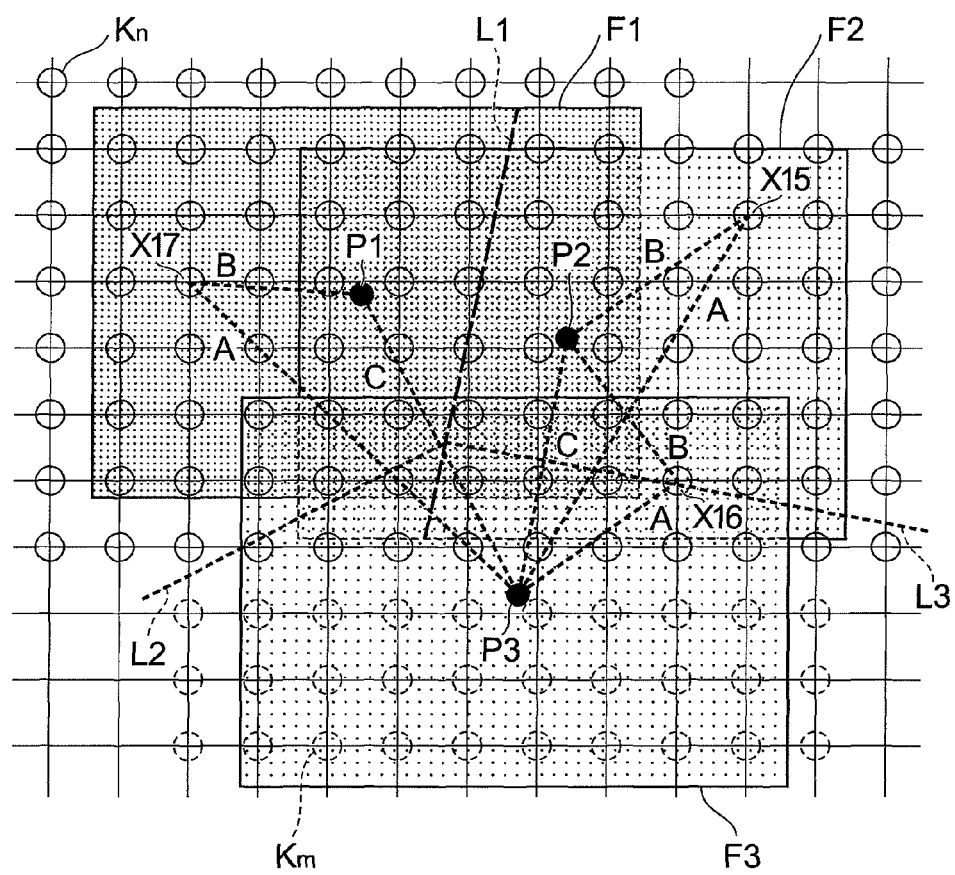
FIG. 14 is an outline diagram for explaining synthesis between the synthetic image and the image input thereafter.
Figure 15:
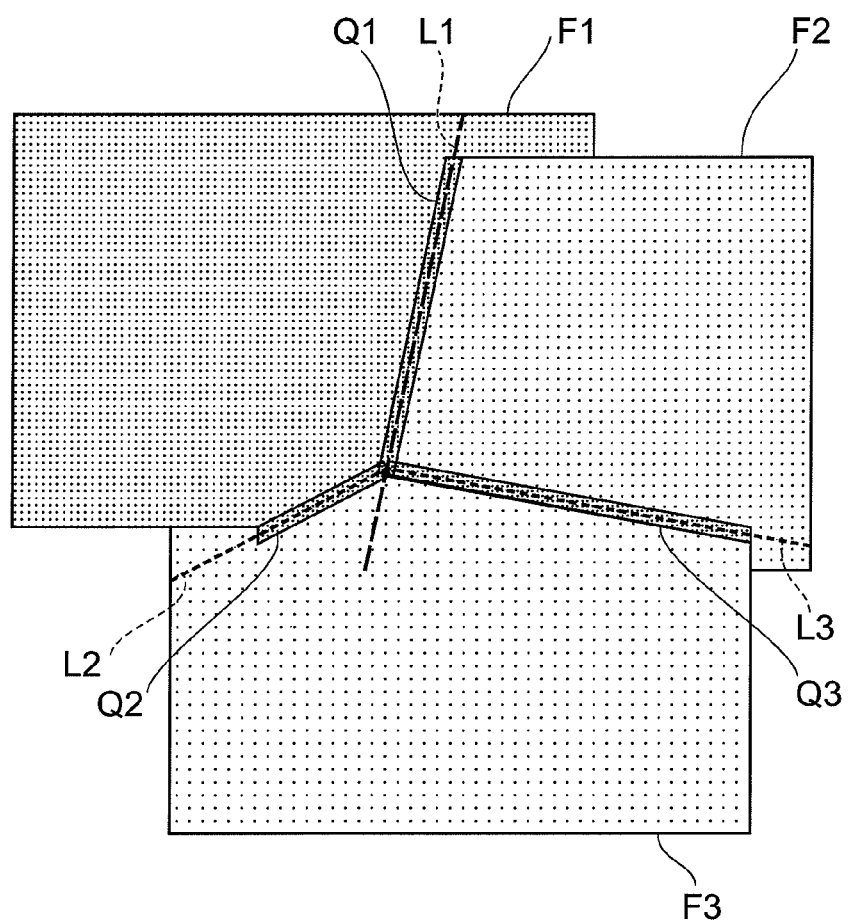
FIG. 15 is an outline image for explaining the synthetic image.

Subsequently, an operation of the image processing device 1 according to this embodiment will be described. FIG. 7 is a flowchart illustrating the operation of the image processing device 1 according to this embodiment. The control processing shown in FIG. 7 is executed at the timing that the image pickup function of the mobile terminal 2 is turned on, for example, and executed repeatedly in a predetermined cycle. For facilitation of understanding, the operation of the image processing device 1 will be described by referring to the diagrams illustrated in FIGS. 8 to 15. FIGS. 8 and 13 are outline diagrams illustrating a case in which one image is to be joined to already-input another image, FIG. 9 is an outline diagram for explaining the brightness absolute value, FIG. 10 is an outline diagram for explaining the brightness-value conversion factor, FIGS. 11 and 12 are outline diagrams for explaining the correction function, and FIGS. 14 and 15 are outline diagrams illustrating a case in which one image is to be joined to already-input and synthesized another image.

As shown in FIG. 7, first, the image processing device 1 executes initialization processing (S12). As shown in FIG. 6, the image input portion 10 receives an input from the image F1 of the camera 30 and stores it as the first image F1 in the first temporary storage region. Then, the center-position obtainment portion 11 obtains position information of the first center point P1, which is the center point of the first image F1. Then, the synthetic image generation portion 12 arranges grid-arrayed points $K_n$ (n: integer) on the synthetic campus (synthetic image) so as to include the first image F1. Then, the synthetic image generation portion 12 specifies the first center point P1 as the first center point being closest to the grid point $K_n$, associates the first center point P1 with each of the grid points $K_n$, and records it in the center-position storage portion 13. Thereby, the initialization processing is finished. When the processing at S12 is finished, the routine proceeds to input processing of the second image (S14).

In the processing at S14, the image input portion 10 receives the input of the image F2 from the camera 30 and stores it as the second image F2 in the second temporary storage region. Here, the second image F2 is an image having the same size taken at a different image pickup position from that of the first image F1, and is an image having an overlapping region with the first image F1. When the processing at S14 is finished, the routine proceeds to the obtainment processing of the position of the center point and the overlapping region obtainment processing (S15, S17). The obtainment processing of the position of the center point and the overlapping region obtainment processing are executed in parallel thereafter. First, the obtainment processing of the position of the center point will be described.

In the processing at S15, the center-position obtainment portion 11 obtains the position information of the second center point P2, which is the center point of the second image F2. For example, the center-position obtainment portion 11 obtains the position information of the second center point P2 on the basis of the motion vectors of the first image F1 and the second image F2. When the processing at S15 is finished, the routine proceeds to the obtainment processing of the distance between the center points (S16).

In the processing at S16, the distance calculation portion 121 calculates the distance between the first center point P1 and the second center point P2 on the basis of the position information of the first center point P1 obtained in the processing at S12 and the position information of the second center point P2 obtained in the processing at S16. As shown in FIG. 8, a distance C between the first center point P1 of the first image F1 and the second center point P2 of the second image F2 is calculated. By calculating the distance C between the center points, the distance to the perpendicular bisector L1 between the first center point P1 and the second center point P2 can be evaluated, and the perpendicular bisector L1 can be used as the joint between the image F1 and the image F2. When the processing at S16 is finished, the routine proceeds to the brightness-value conversion factor calculation processing (S19).

On the other hand, in the processing at S17, the overlapping region obtainment portion 14 obtains the overlapping region of the first image input in the processing at S12 and the second image input in the processing at S14. For example, the overlapping region obtainment portion 14 obtains an overlapping region R1 on the basis of the motion vectors of the first image F1 and the second image F2. When the processing at S17 is finished, the routine proceeds to the brightness absolute value calculation processing (S18).

In the processing at S18, the brightness absolute-value calculation portion 15 calculates a brightness absolute value H on the basis of the overlapping region R1 obtained in the processing at S17. FIG. 9 is a graph illustrating the brightness value at the synthetic position of each image with the horizontal axis indicating the synthetic campus position and the vertical axis for the brightness value. As shown in FIG. 9, it is assumed that the first image F1 and the second image F2 overlap each other in the overlapping region R1. Here, it is assumed that based on the first image F1 input first, a brightness absolute value $H_1$ of the first image F1 is 1. Also, it is assumed here that a ratio of the total sum $S_1$ of the pixel values of the first image F1 in the overlapping region R1 to the total sum $S_2$ of the pixel values of the second image F2 in the overlapping region R1 ($S_2/S_1$) is 1.2. In this case, the brightness absolute-value calculation portion 15 calculates a brightness absolute value $H_2$ of the second image F2 as 1.2 using the above-mentioned formula 1. When the processing at S18 is finished, the routine proceeds to the brightness-value conversion factor calculation processing (S19).

in the processing at S19, the brightness-value conversion factor calculation portion 16 specifies the perpendicular bisector of the first center point and the second center point from the obtained position information of the center point, obtained in the processing at S15 and S16. The brightness-value conversion factor calculation portion 16 calculates the brightness-value conversion factor J on the basis of the brightness absolute value $H_2$ of the second image F2 specified in the processing at S18 and the brightness absolute value $H_f$ of the first image F1 stored in the brightness absolute value storage portion. For example, the brightness-value conversion factor calculation portion 16 stores the brightness absolute value $H_f$ of the first image F1 in the brightness absolute value storage portion before the brightness-value conversion factor J is calculated. The brightness-value conversion factor calculation portion 16, after the conversion, stores the brightness absolute value obtained by multiplying the brightness absolute value $H_2$ of the second image F2 by the brightness-value conversion factor J in the brightness absolute value storage portion of the first image F1 as the brightness absolute value $H_f$ after the synthesizing. FIG. 10 is an outline diagram for explaining the determination processing of the brightness-value conversion factor J of the second image. Here, it is assumed, for example, the brightness absolute value $H_f$ of a given image constituting the first image F1 is 1.1, and the brightness absolute value $H_2$ of the second image F2 input subsequent to this image is 1.2. In this case, the brightness-value conversion factor calculation portion 16 calculates the brightness-value conversion factor J using the formula 2 as 0.92 since the distance D from the perpendicular bisector L is 0 for a synthetic position G1 existing on the perpendicular bisector L1. As for a synthetic position G2, assuming that a weight $D/D_0$ of the input image is 0.7, the brightness-value conversion factor J is calculated as 0.97 using the formula 2. Moreover, for a synthetic position G3, according to the relation $D > D_0$, assuming that the weight $D/D_0$ of the input image as 1, the brightness-value conversion factor J is calculated as 1.00 using the formula 2. When the processing at S19 is finished, the routine proceeds to the synthesizing processing (S20).

In the processing at S20, the synthesizing portion 122 sets the correction function Y and corrects the second image and then, joins the image F1 and the image F2 so as to generate a synthetic image. First, the setting of the correction function Y will be described. FIGS. 11 and 12 are outline diagrams for explaining correction functions Y1 and Y2, in which the horizontal axis indicates the input image value and the vertical axis for the final pixel value. That is, the correction functions Y1 and Y2 are functions that return the value of the final pixel value when the input pixel value is given. The synthesizing portion 122 sets the correction functions Y1 and Y2 using the brightness-value conversion factor J as the inclinations of the correction functions Y1 and Y2, that is, using the brightness-value conversion factor J as a proportional constant of the linear function. For example, the correction function Y1 in FIG. 11 is an example in which the brightness-value conversion factor J=1.15 and for example, the correction function Y2 in FIG. 11 is an example in which the brightness-value conversion factor J=0.80.

Here, if the correction function is set as a linear function, regardless of the magnitude of the brightness-value conversion factor J, the larger the input pixel value is, the larger the difference between the input pixel value and the final pixel value becomes. For example, if the input pixel values are "50" and "220", they are converted into "58" and "253" as the final pixel values by the correction function Y1, respectively, and the differences are "8" and "33". Also, they are converted into "40" and "176" as the final pixel values by the correction function Y2, and the differences are "10" and "44", respectively. As described above, it is known that the larger the input pixel value is, the larger the difference between the input pixel value and the final pixel value becomes. Also, with the correction function Y1, the final pixel value becomes constant at 255 with respect to the input pixel value not less than a given value, and it is likely that information in the original pixel value will not be expressed properly. Thus, the synthesizing portion 122 bends the correction functions Y1 and Y2 at the intersection with a threshold value so that the value finally passes through the maximum pixel value (255) in a range where the pixel value before the conversion or the pixel value after the conversion is not less than a predetermined threshold value as shown in FIG. 12, for example. That is, the value is set as a linear function having the brightness-value conversion factor r as inclination in a range from 0 to the threshold value and as a linear function continued from the linear function up to the threshold value and passing through the maximum pixel value from the threshold value to the final pixel value. As a result, the phenomenon that the information in the original pixel value is not properly expressed can be avoided.

The synthesizing portion 122 inputs the second image after the setting of the correction function Y, and converts the pixel value. The pixel value here is expressed by a YUV space, for example, and the pixel value is also changed by changing the brightness value.

Subsequently, the synthesizing portion 122 generates a synthetic image by joining the image F1 and the image F2 after the conversion. As shown in FIG. 8, the first image F1 and the second image F2 are arranged in a coordinate space of the synthetic image. Then, in a region not overlapping the first image F1 in the second image F2, since the grid point $K_n$ is not arranged, a grid point $K_m$ (m: integer, dotted line in the figure) is newly added. As for the newly added grid point $K_m$, the synthesizing portion 122 specifies the first center point P1 as the first center point being closest to the grid point $K_m$ and associates the first center point P1 with each grid point $K_m$ and records information regarding the association in the center-position storage portion 13. At this time, an infinite point is set to P1.

Then, the synthesizing portion 122 evaluates the distance from the perpendicular bisector L1 for each of the grid points $K_n$ and $K_m$ arranged in the first image F1 and the second image F2 and specifies the pixel values at the grid points $K_n$ and $K_m$. The closeness T is calculated by using the above-mentioned formula 3 in order from the grid point $K_n$ located upper left, for example. Then, by setting 16 to the predetermined value W used in determination on whether or not to synthesize the pixel values and by evaluating the closeness T, the pixel value at the grid point $K_n$ is specified. For example, in the case of a grid point X1, the synthesizing portion 122 refers to the center-position storage portion 13 so as to obtain the closest first center point P1, calculates the distance C between the first center point P1 and the second center point P2, the distance A to the first center point P1 and the distance B to the second center point P2, and then calculates the closeness T using the formula 3. The similar processing is also performed for the grid point X2. Since the grid points X1 and X2 are grid points $K_n$ arranged in the first image F1, the synthesizing portion 122 executes the processing of calculating and evaluating the closeness T as described above. On the other hand, as for the newly added grid points $K_m$, since the closeness T is apparently smaller than the threshold value, the closeness T of these grid points Km are set at $-\infty$, and the calculation of the closeness T is omitted.

The synthesizing portion 122 evaluates the calculated closeness T for each grid point $K_n$ and if the closeness T of each grid point $K_n$ is larger than 16 in all the cases in the block surrounded by the grid points $K_n$ at the four corners, the processing is skipped for such a block. For example, since the closeness T is larger than 16 for all the grid points X3 to X6, the processing is skipped for the block surrounded by the grid points X3 to X6. On the other hand, if the closeness T is smaller than $-16$ for the grid points $K_n$ at the four corners, the pixel value of the second image F2 is employed as the pixel value of the block. For example, since the closeness T is smaller than $-16$ for all the grid points X7 to X10, the second image F2 is copied for the block surrounded by the grid points X7 to X10. Then, if the closeness T is not larger than 16 for all the grid points $K_n$ at the four corners, or if the closeness T is not smaller than $-16$ for all the grid points $K_n$ at the four corners, the pixel values of the first image F1 and the second image F2 are synthesized as the pixel value of the block. For example, since the closeness T is larger than 0 for the grid points X11 and X12 and the closeness T is smaller than 0 for the grid points X13 and X14, the pixel values of the first image F1 and the second image F2 are synthesized for the block surrounded by the grid points X11 to X14. In this case, the closeness T at the pixel position in the block is linearly interpolated by the closeness T of X11 to X14, and the closeness T at each pixel position is calculated and evaluated by the threshold value W. The method of evaluation is the same as described above. As for the pixel position of the closeness T not less than the threshold value $-W$ and not more than the threshold value W, an average of the pixel value of the first image F1 and the pixel value of the second image F2 is calculated and set as the pixel value at the pixel position. As described above, first, skipping, copying or synthesizing is determined for each unit of block using the grid point $K_n$, and the block including a spot requiring synthesizing is more finely evaluated with the closeness T subjected to linear interpolation for each pixel and determined for skipping, copying or synthesizing. By executing the processing at S20, as shown in FIG. 13, the image F1 and the image F2 are joined by the perpendicular bisector L1 as the joint, and a band-shaped synthesized region Q1 is formed along the perpendicular bisector L1. The width of the synthesized region Q1 is the threshold value W. Then, the image in which the image F2 is joined to the image F1 is stored as the first image in the first temporary storage region. That is, the first image stored in the first temporary storage region is updated.

The case that the synthesizing portion 122 inputs the second image after the setting of the correction function Y, converts the pixel value and then performs synthesizing was described but the processing of converting the pixel value and the processing of specifying the pixel value may be performed at the same time. In this case, the synthesizing portion 122 specifies the pixel value at the grid point by a determination formula using the distance D instead of the closeness T. For example, the closeness T is calculated using the above-mentioned formula 3 in order from the grid point K located upper left, and the distance D is calculated from the closeness T. Then, 16 is set to the predetermined value W used for determination whether or not to synthesize the pixel values, 240 is set to the maximum distance $D_0$ (⅜ of the 640 pixels, the width of the input image) used in the determination on whether or not to perform brightness conversion, and the distance D is evaluated so as to specify the pixel value at the grid point $K_n$. For example, in the case of the grid point X1, the synthesizing portion 122 refers to the center-position storage portion 13, obtains the closest first center point P1, calculates the distance C between the first center point P1 and the second center point P2, the distance A to the first center point P1, and the distance B to the second center point P2, calculates the closeness T using the formula 3, and calculates the distance D from the closeness T. The same processing is executed for the grid point X2.

The synthesizing portion 122 evaluates the calculated distance D for each grid point $K_n$ and for the block surrounded by the grid points $K_n$ at the four corners, if the respective distances D at the grid points $K_n$ are all larger than 8 (that is, the absolute value of the distance D is larger than 8 and also the synthetic position is closer to the first center point than the second center point), the processing is skipped for such a block. For example, as for the grid points X3 to X6, the distances D are all larger than 8. Thus, the pixel of the first image is employed for the block surrounded by the grid points X3 to X6, and the processing is skipped. On the other hand, if the distances D of the grid points $K_n$ at the four corners are all smaller than $-240$ (that is, the absolute value of the distance D is larger than 240 and also the synthetic position is closer to the second center point than the first center point), the pixel value of the second image F2 is copied as the pixel value of the block. Also, if the distances D of the grid points $K_n$ at the four corners are all not less than $-240$ and smaller than $-8$ (that is, the absolute value of the distance D is larger than 8 and not more than 240 and also the synthetic position is closer to the second center point than the first center point), the pixel value of the second image F2 subjected to the brightness conversion by the correction function Y is copied as the pixel value of the block. Moreover, if the distances D of the grid points $K_n$ at the four corners are all not less than $-8$ and not more than 8 (that is, the absolute value of the distance D is not more than 8), the pixel value of the first image and the pixel value of the second image F2 subjected to the brightness conversion by the correction function Y are synthesized (weighted averaged) as the pixel value of the block. If the determinations on the grid points $K_n$ at the four corners are not the same, the distance D at the pixel position in the block is linearly interpolated by the distance D of the grid points $K_n$ at the four corners, the distance D is calculated at each pixel position and evaluated by the predetermined value W and the maximum distance $D_0$. The method of this evaluation is the same as the one described above. As described above, first, skipping, copying or synthesizing is determined for each unit of block using the grid point $K_n$, and the block including a spot requiring synthesizing is more finely evaluated with the closeness T subjected to linear interpolation for each pixel and determined for skipping, copying or synthesizing. When the processing at S20 is finished, the routine proceeds to the update processing of the center-point position (S22).

The processing at S22 is processing in which the synthesizing portion 122 updates the first center point P1 recorded in the center-position storage portion 13. Since the image F2 is synthesized, there are two first center points P1 and P2. Thus, the synthesizing portion 122 updates the first center point being closest to the grid point $K_n$ for the first image stored in the first temporary storage region. In the case of the grid point X2, for example, since the first center point P1 in the first center points P1 and P2 is closer, which is the same as the previous time, update is not executed. On the other hand, in the case of the grid point X1, for example, since the first center point P2 in the first center points P1 and P2 is closer, the stored information in the center-position storage portion 13 is updated. When the processing at S22 is finished, the routine proceeds to processing of determining presence of the input image (S24).

In the processing at S24, the image input portion 10 determines whether or not there is an image to be further input. For example, if the current count of image pickup times is smaller than the count of automatic continuous shooting times, it is determined there is still an image to be input. In the processing at S24, if it is determined that there is an image to be input, the routine proceeds to the image input processing again (S14). Then, an image F3, for example, is input and stored in the second temporary storage region. Then, the center-position obtainment portion 11 obtains the position of the center point P3 of the image F3 (S15). Then, the distance calculation portion 121 calculates the distances between the first center points P1 and P2 of the synthetic image made of the image F1 and the image F2 stored in the first temporary storage region and the second center point P3 of the input image F2, respectively (S16). At the same time, the overlapping region obtainment portion 14 obtains the overlapping region R2 of the image F2 and the image F3 (S17). Then, as shown in FIG. 9, the brightness absolute-value calculation portion 15 calculates the brightness absolute value of the image F3 using the formula 1 (S18). As described above, the brightness absolute value is based on the first input image, but information of the reference image is not used for the calculation of the brightness absolute value. By performing the calculation as above, when the brightness absolute value is calculated, there is no need to provide information of the reference image and thus, resources required for the calculation can be reduced. Then, the brightness-value conversion factor calculation portion 16 of the image F3 calculates the brightness-value conversion factor of the image F3 (S19). Then, after the image F3 is converted by the correction function, the synthesizing portion 122 generates the synthetic image by joining the images F1 and F2 to the image F3. As shown in FIG. 14, the first images F1 and F2 and the second image F3 are arranged in the coordinate space of the synthetic image. Since the grid point $K_T$, is not arranged in the region not overlapping the first images F1 and F2 in the second image F3, the grid point $K_m$ (m: integer, dotted line in the figure) is newly added. Then, as for the newly added grid point $K_m$, the synthesizing portion 122 specifies the first center point P3 as the first center point being closest to the grid point $K_m$, associates the first center point P3 with each grid point $K_m$ and records information of the association in the center-position storage portion 13. Then, the synthesizing portion 122 evaluates the distance from the perpendicular bisectors L2 and L3 for each grid points $K_n$ and $K_m$ (X15, X16, X17 and the like, for example) arranged in the first images F1 and F2 and the second image F3 similarly to the case of joining the images F1 and F2 and specifies the pixel values at the grid points $K_n$ and $K_m$. As a result, as shown in FIG. 15, an image in which the images F1, F2, and F3 are synthesized is generated. After the synthesizing, the synthesizing portion 122 updates the center-point position of the grid point $K_n$ (S22). As described above, if there is an input image, the processing at S14 to S24 is repeatedly executed.

On the other hand, in the processing at S24, if it is determined that there is no input image, the routine proceeds to the display processing (S26). In the processing at S26, the image processing device 1 outputs the synthetic image stored in the first temporary storage region to the display portion 31 to be displayed. The image processing device 1 may output the image to the display portion 31 after cutting out both the ends of the synthetic image and adjusting the size thereof. When the processing at S26 is finished, the control processing shown in FIG. 7 is finished. The processing at S26 may be executed each time the image is input (that is, between S20 and S24).

By executing the control processing shown in FIG. 7, sequential synthesizing with low load and at high speed can be performed. The processing at S17 corresponds to the overlapping region obtaining step, the processing at S18 to the brightness conversion factor calculating step, and the processing at S19 to S24 to the synthetic image generating step.

Subsequently, an image processing program that causes the mobile terminal (computer) 2 to function as the image processing device 1 will be described.

The image processing program comprises a main module, an input module, and a calculation processing module. The main module is a portion for integrally controlling the image processing. The input module operates the mobile terminal 2 so as to obtain an input image. The calculation processing module comprises a center-position obtaining module, a distance calculating module, an overlapping region obtaining module, a brightness absolute value calculating module, a brightness-value conversion factor calculating module, and a synthesizing module. Functions realized by executing the main module, the input module, and the calculation processing module are the same as the functions of the above-mentioned image input portion 10, the center-position obtainment portion 11, the distance calculation portion 121, the synthesizing portion 122, the overlapping region obtainment portion 14, the brightness absolute-value calculation portion 15, and the brightness-value conversion factor calculation portion 16 of the image processing device 1, respectively.

The image processing program is provided from a storage medium such as a ROM and the like or a semiconductor memory, for example. Also, the image processing program may be provided as a data signal via a network.

According to the image processing device 1, the image processing method and the image processing program according to this embodiment, the motion vector is obtained by the overlapping region obtainment portion 14 on the basis of the second image and the image input immediately before the second image, the overlapping region where the image input immediately before and the second image overlap each other is obtained on the basis of the obtained motion vector, the brightness-value conversion factor J that converts the brightness value of the second image is calculated by the brightness-value conversion factor calculation portion 16 on the basis of the brightness value of the first image and the brightness value of the second image in the overlapping region so that the change in the brightness values of the first image and the second image becomes small, and the first image and the second image converted on the basis of the brightness-value conversion factor J are joined together by the synthetic image generation portion 12. As described above, by obtaining the overlapping region of the image input immediately before and the second image by using the motion vector, the information of the brightness value of the overlapping region can be obtained with low load and at high speed. Thus, when images with different exposure conditions are to be joined together, the processing of making the joint less noticeable can be performed with low load.

Also, according to the image processing device 1, the image processing method and the image processing program according to this embodiment, since the brightness absolute value can be calculated on the basis of the total sum of the brightness values, and the brightness conversion factor can be calculated using this brightness absolute value, robust calculation can be realized with a simple configuration. Also, the brightness absolute value of the second image is calculated on the basis of the brightness absolute value of the image input immediately before without using the total sum of the brightness values of the reference image, which is an image constituting the first image and becomes the basis for calculating the brightness absolute value. That is, there is no more need to always record the total sum of the brightness values of the reference images for calculating the brightness absolute value of the second image, which is sequentially input. Thus, the processing load can be reduced. Moreover, when the brightness-value conversion factor is to be calculated, control of the difference is facilitated by using the brightness absolute value.

Also, according to the image processing device 1, the image processing method and the image processing program according to this embodiment, the brightness value after the conversion of the second image can be corrected such that the farther away from the perpendicular bisector L, which is the joint, the closer the value gets to the original brightness value of the second image.

Also, according to the image processing device 1, the image processing method and the image processing program according to this embodiment, by employing the linear function as the correction function Y, calculation cost of the correction function Y can be kept low. On the other hand, by employing a linear function as the correction function Y, as the pixel value gets larger before the conversion, the difference of the pixel value between before and after the conversion becomes larger, and as a result, there is a fear that an unnatural synthetic image is generated. Thus, in a range in which the pixel value before the conversion or the pixel value after the conversion is equal to or more than a predetermined threshold value, by setting the correction function Y as a linear function continued from the linear function up to the threshold value and passing through the maximum pixel value, a natural synthetic image can be generated while the calculation cost of the correction function Y is kept low.

Also, according to the image processing device 1, the image processing method and the image processing program according to this embodiment, when the first image and the input second image are sequentially synthesized, since the perpendicular bisector L between the first center point and the second center point can be used as the joint, the sequential synthesizing processing can be realized at high speed and with low load.

Also, according to the image processing device 1, the image processing method and the image processing program according to this embodiment, since the pixel value to the position separated from the joint by a predetermined distance is set as the synthetic value, the joint can be made less noticeable. Also, since the synthetic value of the pixel value can be calculated by using the second image after the brightness value is converted, a large change in the difference in the brightness value can be avoided. Moreover, the adjustment processing of the brightness value and the synthesizing processing of the pixel value can be executed separately and independently, while the processing load is kept low by narrowing the synthetic region close to the joint, for example, the difference between the first image and the second image made noticeable by narrowing the first region can be corrected on the basis of the brightness values of the first image and the second image in a region wider than the region where the pixels are synthesized. As described above, an approach to make the joint less noticeable by manipulating the pixel value, and an approach to make the joint less noticeable by manipulating the brightness value, can both be used at the same time. Thus, an image in which hue at the joint are natural and brightness in the image is natural as a whole can be generated.

The above-mentioned embodiment shows an example of the image processing device according to the present invention. The image processing device according to the embodiment is not limited to the image processing device 1 according to this embodiment but may be such that the image processing device according to the present invention is deformed or applied to another device in a range not changing the gist described in each claim.

For example, the example in which the camera 30 continuously takes a still image was described in the above-mentioned embodiment, but the camera 30 may be a camera that takes moving images. In this case, the image input portion 10 may have a function of extracting continuous images from the moving images taken by the camera. Also, the image input by the image input portion 10 may be an image transmitted from another device via a network.

Also, in the above-mentioned embodiment, the size of the images taken by the camera 30 was described to be the same, but the size of the taken image may be different at each taking.

Also, in the above-mentioned embodiment, the region surrounded by the grid points was described to be rectangular, but the shape may be a triangle or other polygons.

Also, in the above-mentioned embodiment, the case that the center-position obtainment portion 11 calculates the motion vector using the input image and the image input immediately before was described, but the calculation method of the motion vector is not limited thereto. For example, the motion vector may be calculated by using the input image and the synthetic image generated until then.

Moreover, in the above-mentioned embodiment, the example that when the first image and the second image overlap each other, the brightness value of the second image is manipulated was described, but it may be a case in which only the brightness value of the first image is manipulated or a case in which the brightness values of both the first image and second image are manipulated.

Reference Signs List
1 image processing device
10 image input portion
11 center-position obtainment portion
12 synthetic image generation portion
121 distance calculation portion
122 synthesizing portion
13 center-position storage portion
14 overlapping region obtainment portion
15 brightness absolute-value calculation portion
16 brightness-value conversion factor calculation portion
31 display portion

The invention claimed is:

1. An image processing device that sequentially generates a synthetic image by joining a first image, which is a single image or is constituted by a plurality of the images joined together, and a second image that is input, every time when the second image is input, the device comprising:

an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector;

a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion that generates the synthetic image by converting the first image or the second image using the brightness conversion factor and by joining the first image and the second image, wherein the synthetic image generation portion determines the brightness-value conversion factor at the synthetic position on the basis of the distance from the joint at the synthetic position, derives a correction function that converts the brightness value of the second image on the basis of the determined brightness-value conversion factor and calculates the brightness value of the second image used at the synthetic position on the basis of the correction function and the brightness value of the second image.

2. The image processing device according to claim 1, further comprising:

a brightness absolute-value calculation portion that calculates a brightness absolute value of the second image, the brightness absolute value being a ratio of the total sum of the brightness values of a predetermined reference image in the first image to the total sum of the brightness values of the second image on the basis of the total sum of the brightness values of the image input immediately before and the total sum of the brightness values of the second image in the overlapping region, wherein the brightness-value conversion factor calculation portion calculates, on the basis of the brightness absolute value of a target image overlapping the second image among the images constituting the first image and the brightness absolute value of the second image, the brightness value conversion factor of the second image that depends on a distance from a joint between the target image and the second image.

3. The image processing device according to claim 1, wherein the brightness-value conversion factor calculation portion calculates the brightness-value conversion factor so that a weight of the second image at a synthetic position becomes large in proportion to the distance from the joint.

4. The image processing device according to claim 3, wherein the correction function is a linear function with the brightness-value conversion factor as a proportional constant in a range in which a pixel value before the conversion and the pixel value after the conversion are less than a predetermined threshold value and a linear function continued from the linear function up to the threshold value and passing through the maximum pixel value in a range in which the pixel value before the conversion or the pixel value after the conversion is equal to more than the predetermined threshold value.

5. The image processing device according to claim 1, wherein the correction function is a linear function with the brightness-value conversion factor as a proportional constant in a range in which a pixel value before the conversion and the pixel value after the conversion are less than a predetermined threshold value and a linear function continued from the linear function up to the threshold value and passing through the maximum pixel value in a range in which the pixel value before the conversion or the pixel value after the conversion is equal to more than the predetermined threshold value.

6. The image processing device according to claim 5, further comprising:

a center-position obtainment portion that obtains the motion vector on the basis of the image input immediately before the second image among the images constituting the first image and the second image, and obtains position information of a first center point, which is a center point of each of the images constituting the first image, and position information of a second center point, which is a center point of the second image, on the basis of the obtained motion vector, wherein the synthetic image generation portion obtains the first center point of the image overlapping the second image among the images constituting the first image and generates the synthetic image by joining the first image and the second image using a perpendicular bisector between the obtained first center point and the second center point as a joint between the first image and the second image on the basis of the obtained position information of the first center point and the position information of the second center point.

7. The image processing device according to claim 1, further comprising:

a center-position obtainment portion that obtains the motion vector on the basis of the image input immediately before the second image among the images constituting the first image and the second image, and obtains position information of a first center point, which is a center point of each of the images constituting the first image, and position information of a second center point, which is a center point of the second image, on the basis of the obtained motion vector, wherein the synthetic image generation portion obtains the first center point of the image overlapping the second image among the images constituting the first image and generates the synthetic image by joining the first image and the second image using a perpendicular bisector between the obtained first center point and the second center point as a joint between the first image and the second image on the basis of the obtained position information of the first center point and the position information of the second center point.

8. The image processing device according to claim 7, wherein the synthetic image generation portion makes a pixel value within a range from the joint between the first image and the second image to a position separated from the joint by a predetermined distance and within a range smaller than the overlapping region, a synthetic value of the pixel value of the first image and the pixel value of the second image.

9. An image processing device that sequentially generates a synthetic image by joining a first image, which is a single image or is constituted by a plurality of the images joined together, and a second image that is input, every time when the second image is input, the device comprising:

an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector;

a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion that generates the synthetic image by converting the first image or the second image using the brightness conversion factor and by joining the first image and the second image, wherein the brightness-value conversion factor calculation portion calculates the brightness-value conversion factor so that a weight of the second image at a synthetic position becomes large in proportion to the distance from the joint.

10. The image processing device according to claim 9, further comprising:

a brightness absolute-value calculation portion that calculates a brightness absolute value of the second image, the brightness absolute value being a ratio of the total sum of the brightness values of a predetermined reference image in the first image to the total sum of the brightness values of the second image on the basis of the total sum of the brightness values of the image input immediately before and the total sum of the brightness values of the second image in the overlapping region, wherein the brightness-value conversion factor calculation portion calculates, on the basis of the brightness absolute value of a target image overlapping the second image among the images constituting the first image and the brightness absolute value of the second image, the brightness value conversion factor of the second image that depends on a distance from a joint between the target image and the second image.

11. The image processing device according to any one of claim 9, further comprising:

a center-position obtainment portion that obtains the motion vector on the basis of the image input immediately before the second image among the images constituting the first image and the second image, and obtains position information of a first center point, which is a center point of each of the images constituting the first image, and position information of a second center point, which is a center point of the second image, on the basis of the obtained motion vector, wherein the synthetic image generation portion obtains the first center point of the image overlapping the second image among the images constituting the first image and generates the synthetic image by joining the first image and the second image using a perpendicular bisector between the obtained first center point and the second center point as a joint between the first image and the second image on the basis of the obtained position information of the first center point and the position information of the second center point.

12. An image processing device that sequentially generates a synthetic image by joining a first image, which is a single image or is constituted by a plurality of the images joined together, and a second image that is input, every time when the second image is input, the device comprising:

an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector;

a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small;

a center-position obtainment portion that obtains the motion vector on the basis of the image input immediately before the second image among the images constituting the first image and the second image, and obtains position information of a first center point, which is a center point of each of the images constituting the first image, and position information of a second center point, which is a center point of the second image, on the basis of the obtained motion vector; and a synthetic image generation portion that generates the synthetic image by converting the first image or the second image using the brightness conversion factor and by joining the first image and the second image, wherein the synthetic image generation portion obtains the first center point of the image overlapping the second image among the images constituting the first image and generates the synthetic image by joining the first image and the second image using a perpendicular bisector between the obtained first center point and the second center point as a joint between the first image and the second image on the basis of the obtained position information of the first center point and the position information of the second center point.

13. The image processing device according to claim 12, further comprising:

a brightness absolute-value calculation portion that calculates a brightness absolute value of the second image, the brightness absolute value being a ratio of the total sum of the brightness values of a predetermined reference image in the first image to the total sum of the brightness values of the second image on the basis of the total sum of the brightness values of the image input immediately before and the total sum of the brightness values of the second image in the overlapping region, wherein the brightness-value conversion factor calculation portion calculates, on the basis of the brightness absolute value of a target image overlapping the second image among the images constituting the first image and the brightness absolute value of the second image, the brightness value conversion factor of the second image that depends on a distance from a joint between the target image and the second image.

14. The image processing device according to claim 12, wherein the synthetic image generation portion makes a pixel value within a range from the joint between the first image and the second image to a position separated from the joint by a predetermined distance and within a range smaller than the overlapping region, a synthetic value of the pixel value of the first image and the pixel value of the second image.

15. An image processing method that sequentially generates a synthetic image by joining a first image, which is a single image or is constituted by a plurality of the images joined together, and a second image that is input, every time when the second image is input, the method comprising causing a computer to perform the steps of:

obtaining a motion vector on the basis of the second image and an image input immediately before the second image among the images constituting the first image, and obtaining an overlapping region where the image input immediately before and the second image overlap each other on the basis of the obtained motion vector;

calculating, on the basis of a brightness value of the first image and a brightness value of the second image, a brightness value conversion factor for converting the brightness value of the first image or the brightness value of the second image on the basis of the brightness value of the first image and the brightness value of the second image in the overlapping region so that a change in the brightness values between the first image and the second image becomes small; and generating the synthetic image by converting the first image or the second image using the brightness conversion factor and by joining the first image and the second image, wherein the step of generating the synthetic image comprising the steps of:

determining the brightness-value conversion factor at the synthetic position on the basis of the distance from the joint at the synthetic position;

deriving a correction function that converts the brightness value of the second image on the basis of the determined brightness-value conversion factor; and calculating the brightness value of the second image used at the synthetic position on the basis of the correction function and the brightness value of second image.

16. An image processing method that sequentially generates a synthetic image by joining a first image, which is a single image or is constituted by a plurality of the images joined together, and a second image that is input, every time when the second image is input, the method comprising causing a computer to perform the steps of:

obtaining a motion vector on the basis of the second image and an image input immediately before the second image among the images constituting the first image, and obtaining an overlapping region where the image input immediately before and the second image overlap each other on the basis of the obtained motion vector;

calculating, on the basis of a brightness value of the first image and a brightness value of the second image, a brightness value conversion factor for converting the brightness value of the first image or the brightness value of the second image on the basis of the brightness value of the first image and the brightness value of the second image in the overlapping region so that a change in the brightness values between the first image and the second image becomes small; and generating the synthetic image by converting the first image or the second image using the brightness conversion factor and by joining the first image and the second image, wherein the step of calculating comprising the steps of calculating the brightness-value conversion factor calculation portion calculates the brightness-value conversion factor so that a weight of the second image at a synthetic position becomes large in proportion to the distance from the joint.

17. An image processing program embodied on a computer readable medium that causes a computer to function so as to sequentially generate a synthetic image by joining a first image, which is a single image or is constituted by a plurality of the images joined together, and a second image that is input, every time when the second image is input, the program causing a computer to function as:

an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector;

a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion that generates the synthetic image by converting the first image or the second image using the brightness conversion factor and by joining the first image and the second image, wherein the synthetic image generation portion determines the brightness-value conversion factor at the synthetic position on the basis of the distance from the joint at the synthetic position, derives a correction function that converts the brightness value of the second image on the basis of the determined brightness-value conversion factor and calculates the brightness value of the second image used at the synthetic position on the basis of the correction function and the brightness value of the second image.

18. An image processing method that sequentially generates a synthetic image by joining a first image, which is a single image or is constituted by a plurality of the images joined together, and a second image that is input, every time when the second image is input, the method comprising the steps of:

obtaining a motion vector on the basis of the second image and an image input immediately before the second image among the images constituting the first image, and obtaining an overlapping region where the image input immediately before and the second image overlap each other on the basis of the obtained motion vector;

calculating, on the basis of a brightness value of the first image and a brightness value of the second image, a brightness value conversion factor for converting the brightness value of the first image or the brightness value of the second image on the basis of the brightness value of the first image and the brightness value of the second image in the overlapping region so that a change in the brightness values between the first image and the second image becomes small;

obtaining the motion vector on the basis of the image input immediately before the second image among the images constituting the first image and the second image;

obtaining position information, of a first center point, which is a center point of each of the images constituting the first image, and position information of a second center point, which is a center point of the second image, on the basis of the obtained motion vector; and generating the synthetic image by converting the first image or the second image using the brightness conversion factor and by joining the first image and the second image, wherein the step of generating the synthetic image comprising the steps of:

obtaining the first center point of the image overlapping the second image among the images constituting the first image; and generating the synthetic image by joining the first image and the second image using a perpendicular bisector between the obtained first center point and the second center point as a joint between the first image and the second image on the basis of the obtained position information of the first center point and the position information of the second center point.

19. An image processing program that causes a computer to function so as to sequentially generate a synthetic image by joining a first image, which is a single image or is constituted by a plurality of the images joined together, and a second image that is input, every time when the second image is input, the program causing a computer to function as:

an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector;

a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small; and a synthetic image generation portion that generates the synthetic image by converting the first image or the second image using the brightness conversion factor and by joining the first image and the second image, the brightness-value conversion factor calculation portion calculates the brightness-value conversion factor so that a weight of the second image at a synthetic position becomes large in proportion to the distance from the joint.

20. An image processing program that causes a computer to function so as to sequentially generate a synthetic image by joining a first image, which is a single image or is constituted by a plurality of the images joined together, and a second image that is input, every time when the second image is input, the program causing a computer to function as:

an overlapping region obtainment portion that obtains a motion vector on the basis of the second image and an image input immediately before the second image among the images constituting the first image, and obtains an overlapping region where the image input immediately before and the second image overlap each other on the basis of the obtained motion vector;

a brightness-value conversion factor calculation portion that calculates a brightness conversion factor for converting a brightness value of the first image or a brightness value of the second image on the basis of the brightness value of the first image and the brightness value of the second image in the overlapping region so that a change in the brightness values between the first image and the second image becomes small;

a center-position obtainment portion that obtains the motion vector on the basis of the image input immediately before the second image among the images constituting the first image and the second image, and obtains position information of a first center point, which is a center point of each of the images constituting the first image, and position information of a second center point, which is a center point of the second image, on the basis of the obtained motion vector; and a synthetic image generation portion that generates the synthetic image by converting the first image or the second image using the brightness conversion factor and by joining the first image and the second image, the synthetic image generation portion obtains the first center point of the image overlapping the second image among the images constituting the first image and generates the synthetic image by joining the first image and the second image using a perpendicular bisector between the obtained first center point and the second center point as a joint between the first image and the second image on the basis of the obtained position information of the first center point and the position information of the second center point.

* * * * *